(12) United States Patent
Cericola et al.

(10) Patent No.: US 10,115,493 B2
(45) Date of Patent: Oct. 30, 2018

(54) SURFACE-MODIFIED CARBON HYBRID PARTICLES, METHODS OF MAKING, AND APPLICATIONS OF THE SAME

(71) Applicant: Imerys Graphite & Carbon Switzerland Ltd., Bodio (CH)

(72) Inventors: Dario Cericola, Claro (CH); Giovanni Juri, Coldrerio (CH); Simone Zurcher, Bellinzona (CH); Michael E. Spahr, Bellinzona (CH)

(73) Assignee: Imerys Graphite & Carbon Switzerland Ltd., Bodio (CH)

( * ) Notice: Subject to any disclaimer, the term of this patent is extended or adjusted under 35 U.S.C. 154(b) by 0 days.

(21) Appl. No.: 15/971,428

(22) Filed: May 4, 2018

(65) Prior Publication Data

US 2018/0254119 A1  Sep. 6, 2018

Related U.S. Application Data

(63) Continuation of application No. 14/401,226, filed as application No. PCT/EP2013/055370 on Mar. 15, 2013, now Pat. No. 9,991,016.

(Continued)

(30) Foreign Application Priority Data

May 21, 2012 (EP) .................................. 12168742

(51) Int. Cl.
*H01B 1/04* (2006.01)
*H01M 4/36* (2006.01)
(Continued)

(52) U.S. Cl.
CPC .............. *H01B 1/04* (2013.01); *C01B 32/20* (2017.08); *H01B 13/0026* (2013.01);
(Continued)

(58) Field of Classification Search
CPC ...... H01M 4/625; H01M 4/627; H01M 4/583; H01M 4/366; H01M 4/133; H01M 4/587;
(Continued)

(56) References Cited

U.S. PATENT DOCUMENTS

2003/0134201 A1  7/2003  Sato et al.
2006/0147790 A1  7/2006  Zaghib et al.
(Continued)

FOREIGN PATENT DOCUMENTS

CN   1761089 A   4/2006
CN   1770930 A   5/2006
(Continued)

OTHER PUBLICATIONS

Welham, N.J.; Berbenni, V., and Chapman, P.G., "Effect of extended ball milling on graphite", Journal of Alloys and Compounds, vol. 349, 2003, pp. 255-263.
(Continued)

*Primary Examiner* — Daniel McCracken
(74) *Attorney, Agent, or Firm* — Finnegan, Henderson Farabow, Garrett & Dunner, LLP

(57) ABSTRACT

The present disclosure relates to surface-modified carbon hybrid particles in agglomerated form, methods for making such surface-modified carbon hybrid particles and their use, for example as conductive additives. The surface-modified carbon hybrid particles are characterized by a high surface area and a high mesopore content. The disclosure also pertains to methods for making dispersions of such compounds in a liquid medium in the presence of a surfactant and their use as conductive coatings. Polymer compounds filled with the surface-modified carbon hybrid particles are also disclosed. A further disclosure relates to the use of surface-modified carbon hybrid particles as carbon supports.

20 Claims, 5 Drawing Sheets

Related U.S. Application Data

(60) Provisional application No. 61/649,412, filed on May 21, 2012.

(51) Int. Cl.

| | | |
|---|---|---|
| H01G 11/42 | (2013.01) | |
| H01G 11/26 | (2013.01) | |
| H01B 13/00 | (2006.01) | |
| H01M 4/583 | (2010.01) | |
| C01B 32/20 | (2017.01) | |
| H01M 4/587 | (2010.01) | |
| H01M 4/133 | (2010.01) | |
| H01G 11/24 | (2013.01) | |
| H01M 4/62 | (2006.01) | |

(52) U.S. Cl.
CPC ............ *H01G 11/24* (2013.01); *H01G 11/26* (2013.01); *H01G 11/42* (2013.01); *H01M 4/133* (2013.01); *H01M 4/366* (2013.01); *H01M 4/583* (2013.01); *H01M 4/587* (2013.01); *H01M 4/625* (2013.01); *H01M 4/627* (2013.01); *Y02E 60/13* (2013.01)

(58) Field of Classification Search
CPC ........ H01G 11/24; H01G 11/42; H01G 11/26; H01B 13/0026; H01B 1/04; C01B 32/20; Y02E 60/13
USPC ......................................................... 423/448
See application file for complete search history.

(56) References Cited

U.S. PATENT DOCUMENTS

| | | | |
|---|---|---|---|
| 2008/0044656 A1 | 2/2008 | Ko et al. | |
| 2009/0208780 A1 | 8/2009 | Sun et al. | |
| 2013/0018204 A1* | 1/2013 | Jeon .................. | C01B 32/20 |
| | | | 562/89 |

FOREIGN PATENT DOCUMENTS

| | | |
|---|---|---|
| CN | 101544497 A | 9/2009 |
| CN | 101717081 A | 6/2010 |
| CN | 102485648 A | 6/2012 |
| EP | 0 917 223 A1 | 5/1999 |
| JP | 9-213335 | 8/1997 |
| JP | 9-241013 | 9/1997 |
| JP | 10-284080 | 10/1998 |
| JP | 2007-290936 | 11/2007 |
| JP | 2010-126418 | 6/2010 |
| JP | 2010-267540 | 11/2010 |
| JP | 2011-514304 | 5/2011 |
| JP | 2012-516826 | 7/2012 |
| JP | 2013-535402 | 9/2013 |
| WO | WO 2010-089326 A1 | 8/2010 |
| WO | WO 2012/02099 A1 | 2/2012 |
| WO | WO 2013/174536 A1 | 11/2013 |

OTHER PUBLICATIONS

Touzik, A.; Hentsche, M.; Wenzel, R., and Hermann, H., "Effect of mechanical grinding in argon and hydrogen atmosphere on microstructure of graphite", Journal of Alloys and Compounds, vol. 426, 2006, pp. 272-276.
Kim, Byoung G.; Choi, Sang K.; Chung, Hun S.; Lee, Jae J.; and Saito, F., "Grinding characteristics of crystalline graphite in a low-pressure attrition system", Powder Technology, vol. 126, 2002, pp. 22-27—XP002540464.
Zhou, W.L.; Ikuhara, Y.; Zhao, W., and Tang, J., "A transmission electron microscopy study of amorphization of graphite by mechanical milling", Carbon, Elsevier, vol. 33, No. 8, 1995, pp. 1177-1180—XP004022496.
International Search Report and Written Opinion dated Nov. 6, 2013, for International Application No. PCT/EP2013/055370.
Spahr, Michael E., "Carbon Conductive Additives for Lithium-Ion Batteries", Science and Technology, 2009, Chap. 5., pp. 119-155.
Nakamura, K.; Shiomi, M.; Takahashi, K.; and Tsubota, M., "Failure modes of valve-regulated lead/acid batteries", Journal of Power Sources, vol. 59, 1996, pp. 153-157.
Shiomi, Masaaki; Funato, Takayuki; Nakamura, Kenji; Takahashi, Katsuhiro; and Tsubota, Masahara, "Effects of carbon in negative plates on cycle-life performance of valve-regulated lead/acid batteries", Journal of Power Sources, vol. 64, 1997, pp. 147-152.
Pavlov, D.; Nikolov, P.; and Rogachev, T., "Influence of carbons on the structure of the negative active material of lead-acid batteries and on battery performance", Journal of Power Sources, vol. 196, 2011, pp. 5155-5167.
Pavlov, D., "Position of the Lead-Acid Battery Among the Secondary Electrochemical Power Sources", Science and Technology, 2011, Chap. 1, pp. 23-26.
Pavlov, D., "Additives to the Pastes for Positive and Negative Battery Plates", Lead-Acid Batteries, Science and Technology, 2011, Chap. 7, pp. 311-361.
Boden, D.P.; Loosemore, D. V.; Spence, M. A.; and Wojcinski, T. D., "Optimization studies of carbon additives to negative active material for the purpose of extending the life of VRLA batteries in high-rate partial-state-of-charge operation", Journal of Power Sources, vol. 195, 2010, pp. 4470-4493.
Yao, Zhen-Dong; Wei, Wei; Wang, Jiu-Lin; Yang, Jun; and Nuli Yan-Na, "Review of Sulfur-Based Cathodes for High Performance Lithium Rechargeable Batteries", Acta Physico-Chimica Sinica, vol. 27, No. 5, 2011, pp. 1005-1016.
Müller, S.; Holzer, F.; Arai, H.; and Haas, O., "A Study of Carbon-Catalyst Interaction in Bifunctional Air Electrodes for Zinc-Air Batteries", Journal of New Materials for Electrochemical Systems, vol. 2, 1999, pp. 227-232.
Maillard, Frédéric ; Simonov, Pavel A.; and Savinova, Elena R., "Carbon Materials as Supports for Fuel Cell Electrocatalysts", Carbon Materials for Catalysis, 2009, pp. 429-480.
Hull, A. W., "A New Method of X-Ray Crystal Analysis", Physical Review, vol. X, No. 6, 1917, pp. 661-696.
Primak, W., and Fuchs, L. H., "Electrical Conductivities of Natural Graphite Crystals", Physical Review, vol. 95, No. 1, 1954, pp. 22-30.
Welham, N. J., and Williams, J. S., "Extended Milling of Graphite and Activated Carbon", Carbon, vol. 36, No. 9, 1998, pp. 1309-1315.
Ong, T. S., and Yang, H., "Effect of atmosphere on the mechanical milling of natural graphite", Carbon, vol. 38, 2000, pp. 2077-2085.
Kuga, Yoshikazu; Shirahige, Minoru; Ohira, Yuichi; and Ando, Koji, "Production of finely ground natural graphite particles with high electrical conductivity by controlling the grinding atmosphere", Carbon, vol. 40, 2002, pp. 695-701.
Probst, Nicolas, "Conducting Carbon Black", Carbon Black, Science and Technology, $2^{nd}$ ed., Chap. 8, 1993, pp. 271-288.
Fernandez, Melchior, "Carbon additives-the booster for Spiral wound batteries", BEST, 2011, pp. 81-93.
Fernandez, M.; Muñoz, N.; Nuño, R.; and Trinidad, F., "Carbon and Graphite for Lead-Acid Hybrid Batteries. Electrochemical Methods of Testing at Electrode Level", $8^{th}$ International Conference on Lead Acid Batteries, Extended Abstract #6, 2011, 6 pgs.
Boden, D. P., "Selection of pre-blended expanders for optimum lead/acid battery performance", Journal of Power Sources, vol. 73, 1998, pp. 89-92.
Brunauer, Stephen; Emmett, P. H.; and Teller, Edward, "Adsorption of Gases in Multimolecular Layers", Journal Am. Chem. Society, vol. 60, 1938, pp. 309-319.
Ravikovitch, Peter I.; Vishnyakov, Aleksey; Russo, Ron; and Neimark, Alexander V., "Unified Approach to Pore Size Characterization of Microporous Carbonaceous Materials from $N_2$, Ar, and $CO_2$ Adsorption Isotherms", American Chemical Society, vol. 16, No. 5, 2000, pp. 2311-2320.

(56) References Cited

OTHER PUBLICATIONS

Jagiello, Jacek; and Thommes, Matthias, "Comparison of characterization methods based on $N_2$, Ar, $CO_2$, and $H_2$ adsorption applied to carbons with various pore size distributions", Carbon, vol. 42, 2004, pp. 1227-1232.

Slickers, K., "Automatic Emission Spectroscopy Brühl Druck and Presshaus Giessen", 1992, pp. 136-141.

Iwashita, Norio; Park, Chong Rae; Fujimoto, Hiroyuki; Shiraishi, Minoru; and Inagaki, Michio, "Specification for a standard procedure of X-ray diffraction measurements on carbon materials", Carbon, vol. 42, 2004, pp. 701-714.

Scherrer, P., "Bestimmung der Größe and der inneren Struktur von Kolloidteilchen mittels Röntgenstrahlen"; Nachrichten von der Gesellschaft der Wissenchaften zu Göttingen, Mathematisch-Physikalische; Göottingen; 1895, 1933; pp. 98-100.

Klug, Harold P., and Alexander, Leroy E., "X-Ray Diffraction Procedures for Polycrystalline and Amorphous Materials", $2^{nd}$ ed., 1974, pp. 306-310.

Takahashi, H.; Kuroda, H.; and Akamatu, H., "Correlation between Stacking Order and Crystallite Dimensions in Carbons", Carbon, vol. 2, 1965, pp. 432-433.

Probst, Nicolaus; and Grivei, Eusebiu, "Structure and electrical properties of carbon black", Carbon, vol. 40, 2002, pp. 201-205.

Moseley, P. T., "Consequences of including carbon in the negative plates of Valve-regulated Lead-Acid batteries exposed to high-rate partial-state-of-charge operation", Journal of Power Sources, vol. 191, 2009, pp. 134-138.

Xiong, Shizhao; Hong, Xiaobin; Xie, Kai; and Rong, Lixia, "Advance in improvement of cycle life of lithium-sulfur batteries", Chemical Industry and Engineering Progress, 2011, pp. 991-996.

Sarangapani, S.; Lessner, P.; Swette, I.; and Giner, J., "Electrocatalysts for Oxygen Reduction and Oxygen Evolution", Proceedings—Electrochemical Society, 1992, pp. 510-522.

Marsh, H., Rodriquez-Reinoso, F., "Activation by $CO_2$ and $H_2O$: Inhibition by C(O) and C(H)", Activated Carbon, 2006, pp. 274-285.

Miaoling, Li; Lehua, Qi; and Hejun, Li; "An Imaging Technique Using Rotational Polarization Microscopy for the Microstructure Analysis of Carbon/Carbon Composites," Microscopy Research and Technique, vol. 75, 2012, pp. 65-73.

Office Action dated Nov. 4, 2015, in corresponding Chinese Patent Application No. 2013800236291.

Search Report for Chinese Application No. 2016105827683, dated Sep. 18, 2017.

* cited by examiner

SURFACE-MODIFIED CARBON HYBRID PARTICLES, METHODS OF MAKING, AND APPLICATIONS OF THE SAME

CLAIM OF PRIORITY

This application is a continuation of U.S. application Ser. No. 14/401,226, filed Nov. 14, 2014, which is a U.S. national stage entry under 35 U.S.C. § 371 from PCT International Application No. PCT/EP2013/055370, filed Mar. 15, 2013, which claims the benefit of priority to the filing dates of U.S. Provisional Application No. 61/649,412, filed May 21, 2012, and European Patent Application No. 12168742.0, filed May 21, 2012, the subject matter of which is incorporated herein by reference in its entirety.

FIELD OF THE DISCLOSURE

The present disclosure relates to surface-modified carbon hybrid particles, methods for preparation thereof, and their use, for example as conductive additives in a variety of applications.

BACKGROUND

Conductive carbon particles are commonly used as fillers to enhance the conductivity in polymers, ceramics, coatings, and electrodes of electrochemical systems. For example, carbon conductive additives are used in a variety of primary and secondary batteries like alkaline zinc/manganese dioxide batteries, zinc carbon batteries, lithium primary and rechargeable batteries, nickel cadmium batteries, lead acid batteries, and nickel metal hydride batteries, lithium sulfur batteries, lithium air batteries, metal air batteries with metals like zinc or iron, fuel cells as well as capacitor systems.

Conductive additives are applied in electrodes of electrochemical cells to decrease the electrical electrode resistance. Carbonaceous powdered materials are often selected as conductive additives due to their light weight and inertness towards acidic and alkaline electrolytes. Conductive additives do not contribute to the electrochemical processes of the electrode, which means that for a high energy density of the cell, the applied quantity of conductive additive is desirably minimized. Typical carbon conductive additives used are fine graphite powders and conductive carbon black (see for example, M. E. Spahr, Lithium-ion Batteries-Science and Technology, M. Yoshio, R. J. Brodd, A. Kozawa (Eds.), Springer, New York, 2009, Chapter 5).

The addition of a small amount of conductive carbon to the negative electrode of a lead acid battery leads to an improvement of the cycle life and charge acceptance when the battery works in high-rate partial state-of-charge (HRP-SoC) mode as for example applied in the use of hybrid electric vehicles (see for example, K. Nakamura, M. Shiomi, K. Takahashi, M. Tsubota, Journal of Power Sources 59 (1996) 153, M. Shiomi, T. Funato, K. Nakamura, K. Takahashi, M. Tsubota, Journal of Power Sources, 64 (1997), 147 and D. Pavlov, P. Nikolov, T. Rogachev Journal of Power Sources 196 (2011) 5155-5167). When a lead acid battery is operated at partial state-of-charge (PSoC) the irreversible formation of lead acid sulfate ("sulfation effect") causes a significant reduction of the battery cycle life (see, for example, D. Pavlov, Lead-Acid Batteries-Science and Technology, Elsevier 2011, Chapter 1, pp. 23-26).

Besides using carbon additives, it is known in the art to use modified grid designs, glass fiber mats inside the active material, and/or modified electrolyte compositions as other ways to improve the conventional starting, lighting, ignition (SLI) lead acid batteries and make them useful for operation modes at lower states of charge (SOC) (cf., for example, D. Pavlov, Lead-Acid Batteries-Science and Technology, Elsevier 2011, Chapter 7). The battery characteristics obtained in these advanced lead acid batteries at shallow high rate discharge operations make them good candidates for micro- and mild hybrid electric vehicles.

The addition of graphite, expanded graphite, activated carbon, and carbon black to the negative electrode has been shown to result in an improvement of the cycle life of the lead acid batteries, primarily by a reduction of the sulfation effect.

Several hypotheses have been proposed to explain the mechanism of the carbon effect in the negative electrode. A survey of the influence of a wide spectrum of carbons has been summarized in the literature (P. T. Moseley, Journal of Power Sources 191 (2010) 134-138 and D. P. Boden, D. V. Loosemore, M. A. Spence, T. D. Wojcinski, Journal of Power Sources, 195 (2010) 4470-4493). It has been shown recently that the carbon should have a high affinity to lead in order to enable the formation of a carbon-lead skeleton in the negative electrode while plating lead during the electrode formation performed in the first charging of the fresh newly assembled cell (D. Pavlov, P. Nikolov, T. Rogachev Journal of Power Sources 196 (2011) 5155-5167). This carbon-lead skeleton increases the surface area and in addition the carbon provides an additional supercapacitor effect in the electrode, both of which provide possible explanations for the increased charge acceptance.

In addition to the electrical conductivity properties, conductive additives also have an effect on the electrode structure and porosity. For example, the electrolyte penetration of the electrode can be influenced by the electrode structure and porosity, which has an impact on the ionic resistivity of the electrode (see for example, M. E. Spahr, Lithium-ion Batteries—Science and Technology, M. Yoshio, R. J. Brodd, A. Kozawa (Eds.), Springer, New York, 2009, Chapter 5).

The positive electrode of a lithium sulfur battery contains sulfur mixed with binder materials and one or more carbon components. The carbon provides the electrical conductivity and in addition is thought to assure the dimensional stability of the electrode during the discharge of the cell when the sulfur content of the positive electrode is decreased by the formation of the discharge products (see, for example, Xiong, Shizhao; Hong, Xiaobin; Xie, Kai; Rong, Lixia, Huagong Jinzhan (2011), 30(5), 991-996 and Yao, Zhen-Dong; Wei, Wei; Wang, Jiu-Lin; Yang, Jun; Nuli, Yan-Na, Wuli Huaxue Xuebao (2011), 27(5), 1005-1016).

Furthermore, electrochemical cells with air electrodes, contained in fuel cell stacks or metal air batteries, can require carbons in the positive air electrodes. It is thought that the carbons act as support for the metal or metal oxide catalyst and also generate the structure providing dimensional stability to the electrode. In order to be used in air electrodes, carbon supports are required to demonstrate a high corrosion resistance to air or oxygen, as failure to do so is thought to limit cell durability (see for example, S. Sarangapani, P. Lessner, L. Swette, J. Giner, Proceedings—Electrochemical Society (1992), 92-11(Proc. Workshop Struct. Eff. Electrocatal. Oxygen Electrochem., 1992), 510-22, S. Muller, F. Holzer, H. Arai, O. Haas, Journal of New Materials for Electrochemical Systems (1999), 2(4), 227-232 and F. Maillard, P. Simonov, E. Savinova, Carbon Materials for Catalysis (2009), 429-480).

As mentioned above, natural or synthetic graphite, expanded graphite, activated carbon and carbon black have all been used as conductive additives.

Graphite is crystalline carbon. The electronic conductivity of graphite is based on the crystal graphite structure which consists of stacked layers of six-membered carbon rings with delocalized electrons in conjugated p-orbitals parallel to the graphite layers. The electronic conductivity parallel to the stacked planes is about three orders of magnitude higher than the electronic conductivity perpendicular to the planes. This results in the known anisotropic behaviour of the electronic conductivity (A. W. Hull, Phys. Rev. 10 (1917) 661 and W. Primak, L. H. Fuchs, Phys. Rev. 95(1) (1954) 22).

The application of graphite as, for example, conductive additives could be attributed to properties such as its high compaction ability, which results in improvements in the electrode density of the cell. It has also been demonstrated that a carbon conductive additive can significantly increase the cycling stability and low temperature charge/discharge performance of the electrode. However, although the resistivity at high concentrations of graphite is very low, it has been observed that due to the higher percolation threshold for graphite compared to carbon black, relatively large amounts of graphite are required to decrease resistivity of the electrode.

High surface area graphite is typically obtained by decreasing the particle size of graphite in a milling process. To avoid the oxidation of the graphite product during milling, milling can be carried out in an inert gas atmosphere (see for example, N. J. Welham, J. S. Williams, Carbon 36(9) (1998) 1309-1315, T. S. Ong, H. Yang, Carbon, 38 (2000) 2077-2085 and Y. Kuga, M. Shirahige, Y. Ohira, K. Ando, Carbon 40 (2002), 695-701). A drawback of conventional milling processes is that activated carbon and high surface area graphite can contain a relatively high amount of trace metals due to the use of metal based milling equipment. Metal trace elements may act as electrocatalysts interfering with the desired electrochemical process and cause parasitic chemical or electrochemical side reactions which decrease the cycling stability and reduce the cell life.

Carbon black is an amorphous form of carbon. The carbon black structure is made up of typically spherical amorphous primary particles which are bound together by covalent bonds to form larger aggregates. Conductive carbon black typically consists of primary particles of 10-50 nm in size and large complex aggregates are often more than 100 nm in diameter. The conductive carbon black aggregates form a conductive network in porous electrodes thus decreasing the electronic resistance (J. B. Donnet, R. P. Bansal, M. J. Wang, in *Carbon Black Science and Technology*, 2nd ed., Marcel Dekker Inc., New York, 1993). The large intra- and inter-aggregate void volume of conductive carbon black created by the carbon black structure results in high oil absorption numbers. Conductive carbon blacks typically have oil absorption numbers above 150 mL/100 g (measured according to ASTM D2414-01, see method described below).

Another class of carbonaceous material is activated carbon. Activated carbon is composed of amorphous high surface area carbon powders derived from natural organic products like coconut shells or wooden products or polymers. These precursors are carbonized at temperatures between 700 and 1600° C. Subsequent to carbonization, the material is subjected to an activation process using steam, $CO_2$, or aqueous zinc chloride solutions at elevated temperatures which increases the BET surface area of the carbonized material. The activation process forms so-called "micro-pores" which are thought to be the cause for the observed increase in surface area (see for example, H. Marsh, F. Rodriguez-Reinoso, Activated Carbon, Elsevier, 2006).

The use of carbon black as, for example, a conductive additive can be attributed to properties such as high liquid absorption, which appears to lead to a higher electrolyte penetration. Furthermore, the addition of the high surface area carbon component has been observed to result in a noticeable increase of the charge acceptance due to the increased electrochemically available inner electrode area, which appears to be a consequence of the more "open" structure of the electrode. A further explanation for the positive effect of carbon black additives is that the charging of the additional carbon surface (supercapacitor effect) may lead to an increased electrochemical capacity, which is a desired property in, for example, lead acid battery negative electrodes and supercapacitors.

However, despite the applications of high surface area carbons as carbon additives, some adverse consequences with respect to cycle life, performance at high rate and low temperature discharge have been observed. A further problem associated with high surface area carbon components is a high water up-take as a paste formulation, which may interfere with the production of the electrodes containing such additives.

Furthermore, the decomposition of the aqueous electrolyte, which happens as a parasitic side reaction in the lead acid battery during charging, leads to hydrogen formation at the negative electrode. It has been found that the electrolyte decomposition rate is accelerated by the high surface area of the carbon and in presence of typical metal impurities. Also, the oxygen formed in this reaction at the positive electrode could be a cause of oxidative carbon corrosion which seems to occur particularly with high surface area amorphous carbons.

It can be seen from the aforementioned properties that conductive carbon additives appear to have a significant impact on the electrode engineering, its properties, and the manufacturing process of the electrode.

As described above, graphite and conductive carbon black appear to have many complementary properties, when considering their use as conductive additives in electrodes. As both low and high surface area carbons (graphite and amorphous carbon powders) have shown to exert positive effects yet suffer from different drawbacks in the intended applications, attempts to use a mixture of the two have been described in the literature (see for example, M. Fernandez, Batteries & Energy Storage (BEST) Spring 2011 81-93 and M. Fernandez, N, Munoz, R. Nuno, F. Trinidad, Proceedings of the 8th International Conference on Lead Acid Batteries, Extended Abstract #6, Lead Acid Battery Department of the Bulgarian Academy of Science, Sofia, Bulgaria, Jun. 7-10, 2011, p. 23-28). However, such mixtures are fraught with problems. For example, in the manufacturing process of the negative electrode, the required homogeneous mixing of two carbon components, one of which has a very low volume density in the lead oxide paste formulation, can be problematic.

Accordingly, it is an object of the invention to provide an alternative carbon material which can be reliably made, is easy to handle and has excellent physicochemical and electrochemical properties, especially when used as a conductive additive, as well as methods for its preparation.

SUMMARY

The inventors have found that surface-modified carbon hybrid particles comprising a graphite core coated with amorphous carbon exhibit excellent properties, for example, exhibiting a high surface area combined with a high mesopore content, which appears to provide favorable mechanical and electrochemical properties, for example when used as a carbon additive.

Thus, according to a first aspect, the present invention is directed to surface-modified carbon hybrid particles in agglomerate form with a high BET surface area and a high mesopore area, as measured by density functional theory (DFT), according to the parameters set out below.

Certain embodiments of the surface-modified carbon hybrid particles in agglomerate form of the present invention are preferably characterized as having a BET surface area of at least 50 $m^2/g$ and no greater than 800 $m^2/g$, a DFT mesopore area of at least 40 $m^2/g$ and no greater than 400 $m^2/g$, wherein the DFT mesopore area is equal to or less than the BET surface area.

According to a second aspect, the present invention is directed to a method for making surface-modified carbon hybrid particles, wherein the method comprises milling graphite in a gas-tight sealed mill and functionalizing the resulting hybrid carbon by controlled oxidation. In some embodiments, the method further includes holding the product of the milling step in the mill to allow completion of the agglomeration of the milled primary particles before functionalization. Optionally, the method may also include the preparation of the deagglomerated product, by dispersing the agglomerated product of the functionalization step in a liquid in the presence of a stabilizing amount of a surfactant or in a polymer by applying mainly shear forces.

Accordingly, dispersions of the surface-modified carbon hybrid particles in deagglomerated form obtainable by the above method are a further related aspect of this invention. Another aspect of the invention is the use of a dispersion of the surface-modified carbon hybrid particles as a conductive or lubricating coating.

Yet another aspect of the present invention relates to a polymer compound filled with the surface-modified carbon particles of the invention and a battery electrode comprising the surface-modified carbon particles of the invention as a conductive additive, and, optionally other compounds such as barium sulfate and/or lignosulfates as functional additives.

A further aspect of the present invention is directed to the provision of a conductive additive comprising the surface-modified carbon hybrid particles in agglomerated form, wherein the conductive additives can be used in a variety of applications such as in lead acid batteries, lithium sulfur batteries, electrochemical double layer capacitors, and others.

Finally, a further aspect of the invention concerns the use of surface-modified carbon hybrid particles as catalyst supports.

DETAILED DESCRIPTION OF EXEMPLARY EMBODIMENTS OF THE INVENTION

Figure 1:
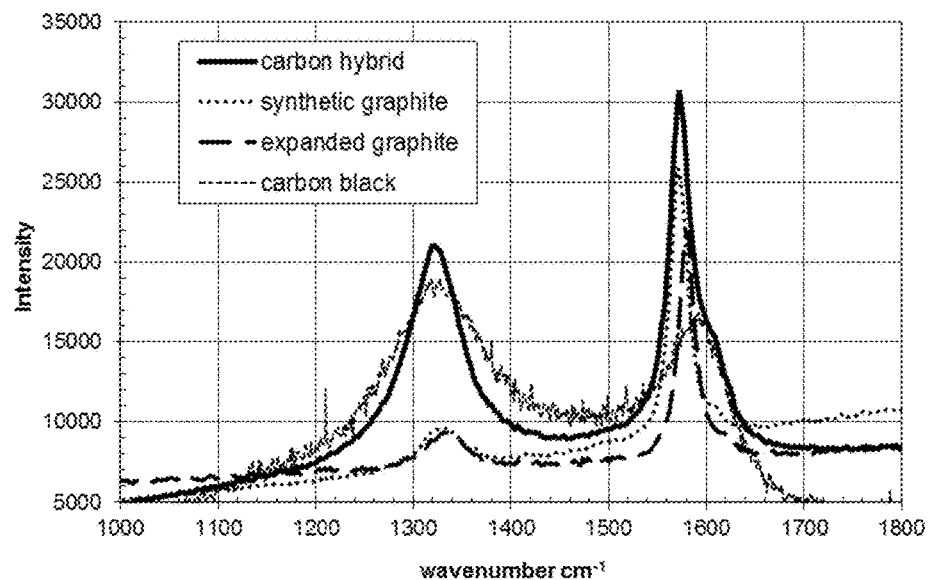
FIG. 1 shows Raman spectra of carbon hybrid D versus synthetic graphite, expanded graphite and carbon black. Compared to graphite and expanded graphite, the increased D-band versus the G-band of the carbon hybrid D indicates increased amorphous character at the superficial regions, while compared to carbon black, the carbon hybrid D exhibits a higher intensity of the G-band indicating a higher degree of graphitization.
Figure 2:
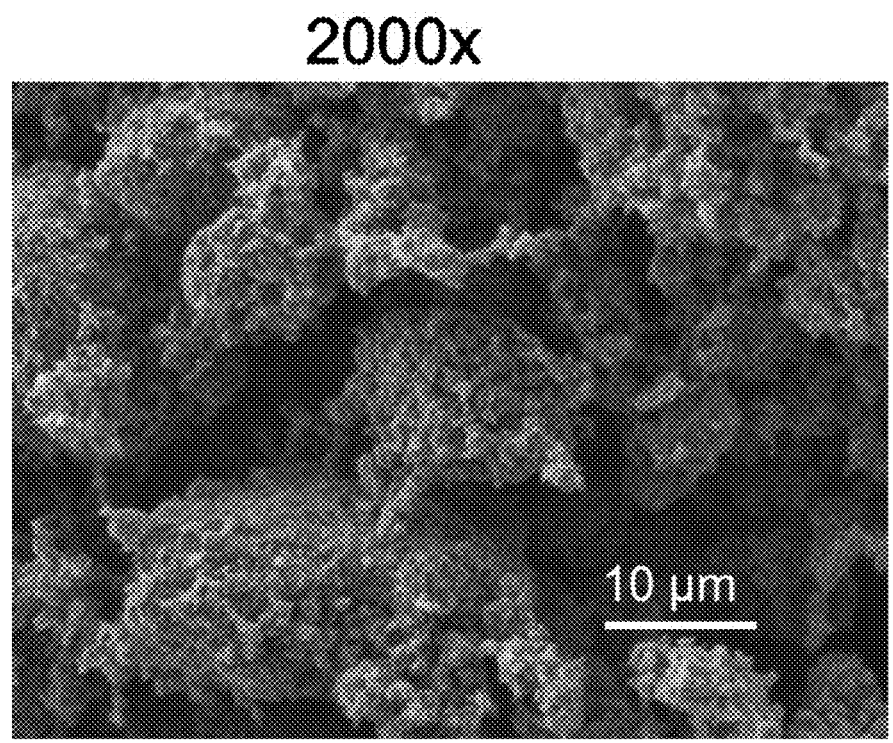
FIG. 2 is a scanning electron microscope picture of carbon hybrid C illustrating the amorphous carbon morphology at the surface of the secondary particles (particle microstructure).
Figure 3:
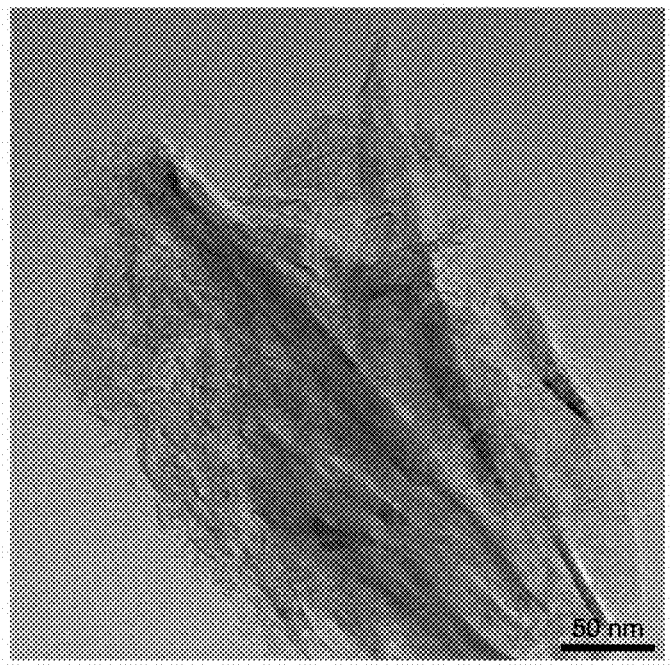
FIG. 3 is a transmission electron microscope picture of carbon hybrid C showing the morphology of a primary particle consisting of a graphite skeleton and the mesoporous amorphous carbon on top of the graphite skeleton.

The inventors have found that carbon hybrid particles comprising a graphite core coated with amorphous carbon and having a modified surface, a high surface area and a high mesopore content, exhibit excellent mechanical and electrochemical properties. These favorable properties make them a good material to use inter alia as conductive additives, as conductive coatings and as carbon supports in a variety of applications.

Surface-Modified Carbon Hybrid Particles

The surface-modified carbon hybrid particles of the present invention comprise a graphite core which is coated with amorphous carbon, which in agglomerated form is characterized inter alia by a high BET surface area of at least 50 $m^2/g$, or at least 80 $m^2/g$, or at least 100 $m^2/g$ while not exceeding 800 $m^2/g$, or 700 $m^2/g$, or 600 $m^2/g$, or 500 $m^2/g$. The particles are further characterized by a DFT mesopore area of at least 40 $m^2/g$, or at least 60 $m^2/g$, or at least 70 $m^2/g$, or at least 80 $m^2/g$, while not exceeding 400 $m^2/g$, or 300 $m^2/g$, or 200 $m^2/g$.

In many embodiments a characteristic of the high-surface area surface-modified carbon hybrid particles is that the proportion of mesopores as opposed to micropores on the surface is high, wherein the ratio of DFT mesopore area to total DFT pore area is from 20 to 90%, or from 40 to 90%, or from 45 to 75%, or from 50 to 70%. Similarly, the DFT mesopore volume of the surface-modified carbon hybrid particles is at least 0.10 cm$^3$/g, or at least 0.15 cm$^3$/g, or at least 0.17 cm$^3$/g, or at least 0.29 cm$^3$/g, and/or the ratio of DFT mesopore volume to total DFT pore volume is from 50 to 95%, or from 70 to 95%, or from 80 to 95%. This data demonstrates that a large proportion of the surface pore area is made up of mesopores and an even larger proportion of the total pore volume is made up of mesopores.

Typically, the carbon hybrid particles are present in agglomerate form, resulting in the formation of a microstructure wherein sub-micron non-agglomerated particles are bound together to form the agglomerate micro-structures. These micro-structures have been found to act as hosts with good mechanical stability for use in sulfur cathodes in lithium sulfur batteries. In certain embodiments of the present invention, the agglomerates are characterized (using the wet dispersion method described below) to have a $D_{90}$ value of from 20 to 60 µm, or from 30 to 50 µm, or from 40 to 50 µm and/or a $D_{50}$ value of from 7 to 15 µm, or from 7 to 12 µm and/or a $D_{10}$ value of from 0.3 to 4 µm, or from 0.4 to 3 µm, or from 0.5 to 2 µm. In some embodiments, the agglomerates can also be characterized to have a $D_{90}$ value of from 50 to 300 µm, or from 100 to 300 µm, or from 100 to 200 µm, or from 150 to 200 µm when using the dry dispersion method described infra. The differences in the $D_{90}$ value depending on whether a dry or wet dispersion method is used for the PSD measurement by laser diffraction can be explained by the higher shear forces applied to the agglomerates in the wet dispersion method, which appears to break down the largest agglomerate particles during the dispersion step required for the measurement while the dry dispersion method appears to have less impact on the agglomerate carbon hybrid particle size. In any event, the surface-modified carbon hybrid particles mentioned herein refer to the agglomerated product unless specified otherwise. Likewise, unless specified otherwise, the values given herein (e.g. BET SSA, mesopore area or volume, etc.) also refer to the agglomerated products and not the primary (often sub-micron) particles.

It has been found that the hybrid nature of the carbon hybrid particles appears to combine the properties of both conductive graphite and high surface area carbon black. For example, when the hybrid particles have been used as carbon conductive additives in battery electrodes, good electrical conductivity as well as excellent compressibility has been observed, even at lower concentrations compared to graphite. As mentioned above, using mixtures of graphite and carbon black has been attempted in the prior art, but these suffer from the drawback that the mixture is generally difficult to handle in the manufacturing process. The hybrid carbon particles as described herein (which are typically present in agglomerated form) are in contrast thereto easy to produce and to handle, whilst still benefitting from the advantageous properties of both graphite and carbon black.

According to an embodiment of the invention, the surface-modified carbon hybrid particles are also characterized by an increased concentration of chemisorbed oxygen-groups on the carbon surface, which herein is referred to as "surface oxides". Thus, in some embodiments of the invention, the oxygen content of the surface-modified carbon hybrid particles, as measured according to the method set out below, is at least 0.45% w/w, or at least 0.85% w/w, or at least 1% w/w, or at least 2% w/w, or at least 3% w/w and typically no greater than 7% w/w, or no greater than 8% w/w. As can be seen in Table 2 below, the comparative examples of a variety of known carbon materials all have an oxygen content of 0.41% w/w or below. Since some of the oxygen groups on the surface of the particles are effectively carboxyl groups, it is not surprising that in most embodiments, the surface-modified carbon hybrid particles have an acidic pH, i.e. a pH of below 7.0, preferably below 6.7, or below 6.5, or below 6.0, or below 5.5, or even below 5.0.

Figure 10:
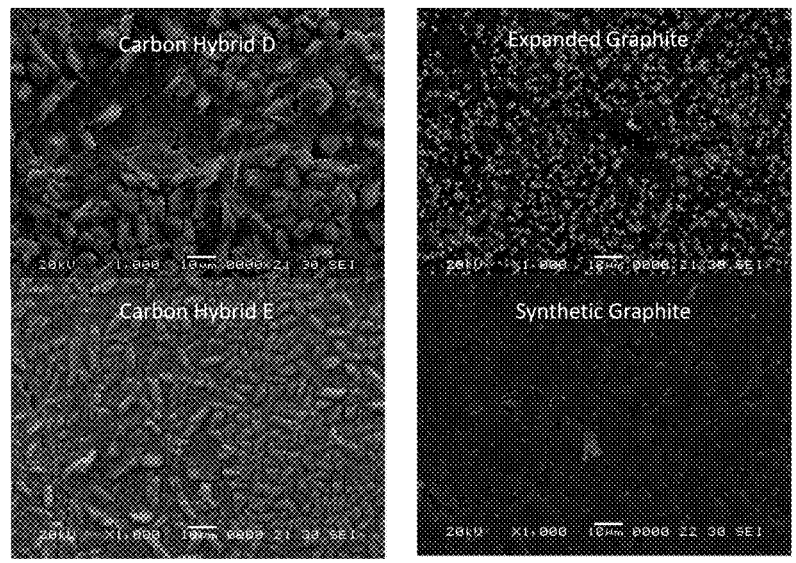
FIG. 10 shows a scanning electron microscopy picture illustrating the homogeneous plating of lead crystals on an electrode containing carbon hybrid D or carbon hybrid E.

Without wishing to be bound by theory, the concentration of "surface oxides" appears to be especially relevant for the affinity of the particles to lead. This is particularly important when using the surface-modified hybrid carbon particles as conductive additives in the negative electrode of a lead acid battery. Furthermore, the combination of high mesopore content and high concentration of "surface oxides" seems to lead to excellent lead plating properties (cf. FIG. 10).

The tapped density of the surface-modified carbon hybrid particles according to some embodiments will typically be from 0.35 to 0.7 g/cm$^3$, or from 0.4 to 0.7 g/cm$^3$. Alternatively, the surface-modified carbon hybrid particles can also be characterized by their so-called Scott density. Thus, in many embodiments the Scott density of the surface-modified carbon particle will typically range from 0.2 to 0.6 g/cm$^3$, or from 0.25 to 0.6 g/cm$^3$.

Interestingly, due to the particular morphology of the surface-modified hybrid carbon particles, the oil absorption is significantly lower than other carbons with comparable pore volume and BET SSA, e.g. carbon black or activated carbon. In some embodiments, the oil absorption is 150% w/w or less, or 140% w/w or less, or 120% w/w or less, 100% w/w or less or 80% w/w or less. The method used to determine the oil absorption for the carbon hybrid particles is the same method used to determine the oil absorption for graphite, which is described below. The oil absorption that is observed for the carbon hybrid particles is in the range of the typical oil absorption values obtained for graphite and is thus significantly lower than for carbon black or activated carbon.

For some embodiments, the surface-modified carbon hybrid particles can be further characterized by an ash content of below 0.1%, or below 0.08%, or below 0.05%, and/or by an Fe content value of below 500 ppm, or below 400 ppm, or below 300 ppm, or below 200 ppm, or below 160 ppm. In some embodiments, particularly where non-metal milling media are used in the milling step, e.g. milling media made from $ZrO_2$, $Al_2O_3$ or ceramic materials, the surface-modified carbon hybrid particles can be characterized by an Fe content value of below 50 ppm, or below 10 ppm, or below 5 ppm.

In relation to the crystal structure, the surface-modified carbon hybrid particles have in certain embodiments a crystallite size $L_a$ (as measured by Raman spectroscopy) from 1 to 10 nm, or from 3 to 8 nm, or from 4 to 6 nm, and/or a crystallite size $L_c$ (as measured by XRD) of from 10 to 100 nm, or from 10 to 60 nm, or from 10 to 50 nm.

In most embodiments, the c/2 value of the surface-modified carbon hybrid particles is between 0.3355 to 0.3400 nm, and preferably between 0.3358 to 0.3380 nm. Accordingly, the degree of graphitization of the surface-modified carbon hybrid particles (which is calculated according to the method outlined below with the aid of the c/2 value) typically ranges from 80 to 95%, or from 85 to 95%, or from 90 to 95%.

In further embodiments, the surface-modified carbon hybrid particles, when present in deagglomerated form (e.g. in a dispersion stabilized with a wetting agent), can be characterized by a particle size distribution with the following values:

A $D_{90}$ value of non-agglomerated particles of less than 10 µm, or less than 8 µm, or less than 5 µm, or less than 4 µm, or less than 3 µm, or less than 2 µm, or less than 1.8 µm; and/or a $D_{50}$ value of non-agglomerated particles of less than 4 µm, or less than 2 µm, or less than 1 µm, or less than 0.75 µm, or less than 0.4 µm, or less than 0.3 µm; and/or a $D_{10}$ value of non-agglomerated particles of less than 0.6 µm, or less than 0.4 µm, or less than 0.2 µm, or less than 0.15 µm.

Figure 7:
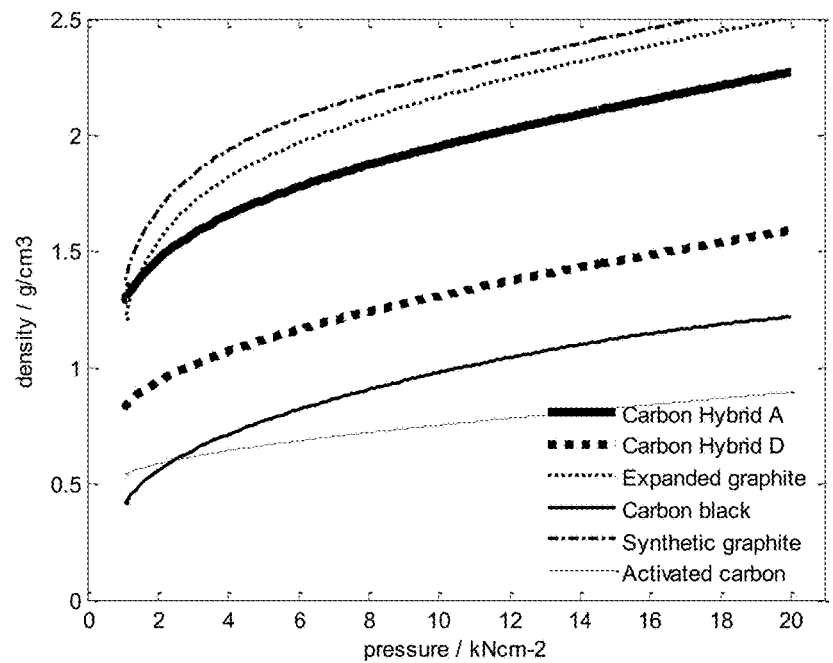
FIG. 7 shows the pressed density at the corresponding pressure of carbon hybrid A and carbon hybrid D in comparison with expanded graphite, carbon black, synthetic graphite and activated carbon. The carbon hybrids indicate an increased pressed density compared carbon black and activated carbon, although it is still slightly lower than for graphite and expanded graphite.

It has been observed that the compaction densities at corresponding pressures are higher for surface-modified carbon hybrid particles than for carbon black and other amorphous carbons like activated carbon. For example, as can been seen in FIG. 7, surface-modified carbon hybrids and amorphous carbons at a pressure of 4 kN/cm$^2$ have a density of about 1-1.75 g/cm$^3$ and 0.5-0.75 g/cm$^3$, respectively and/or at a pressure of 8 kN/cm$^2$ have a density of about 1.2-1.9 g/cm$^3$ and 0-7-0.9 g/cm$^3$ respectively, and/or at a pressure of 12 kN/cm$^2$ have a density of about 1.3-1.9 g/cm$^3$ and 0.75-1.0 g/cm$^3$, respectively and/or at a pressure of 20 kN/cm$^2$ have a density of 1.5-2.25 g/cm$^3$ and 0.8-1.2 g/cm$^3$, respectively.

Figure 8:
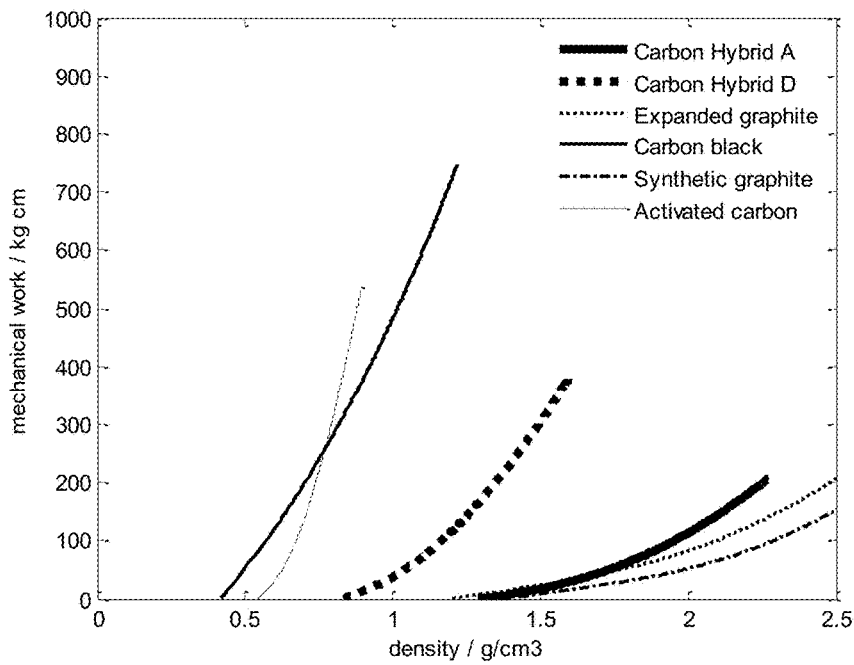
FIG. 8 illustrates the mechanical work (compaction energy) required to reach the corresponding pressed density of carbon hybrid A and carbon hybrid D in comparison with expanded graphite, carbon black, synthetic graphite, and activated carbon.
Figure 9:
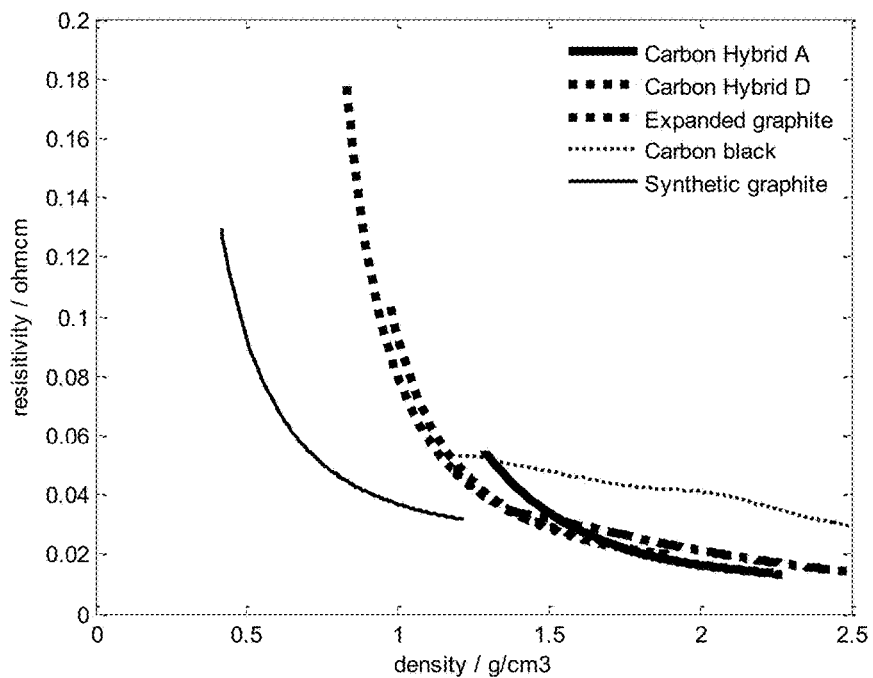
FIG. 9 shows the electrical resistivity, at corresponding sample densities, of carbon hybrid A and carbon hybrid D in comparison to expanded graphite, synthetic graphite, and carbon black. The high conductivity of the carbon hybrids is indicated as well as their hybrid character between graphite and carbon black.

Furthermore, the compaction energy to reach a given compaction density is lower for surface-modified carbon hybrid particles than for carbon black and other amorphous carbons like activated carbon, which can be seen in FIG. 8. For example, at a mechanical work of 100 kg*cm the density of the surface-modified carbon hybrid particle composites is between around 1.2 to 2 g/cm$^3$, whereas for amorphous carbons the density reached is between around 0.55 to 0.65 g/cm$^3$. Similarly, at a mechanical work of 200 kg*cm the densities of the surface-modified carbon hybrid particle composites and amorphous carbons is around 2-2.75 g/cm$^3$ and 0.70-0.75 g/cm$^3$, respectively. Also in some embodiments, the observed spring back percentage is lower for surface-modified carbon hybrid particles at 14-19% than for carbon black, which has a value of around 88%.

It has been postulated that the lower electrical resistivities that have been obtained for the surface-modifies hybrid carbon particles compared to carbon black could be due to the good compressibility to high compaction densities that presumably lead to better inter-granular electrical contacts of the surface-modified carbon hybrid particles. In fact, at corresponding compaction densities, the electrical resistivity that can be obtained for the surface-modified carbon hybrid particles approaches that of graphite, which in turn is lower than the resistivity obtained with carbon black.

Methods for Making Surface-Modified Carbon Hybrid Particles

In another aspect, the current invention provides a method of making surface-modified carbon hybrid particles as defined herein, comprising the steps of
a) milling graphite in a gas-tight sealed mill; and
b) functionalizing the resulting carbon hybrid particles by controlled oxidation.

As used herein, controlled oxidation is a planned and deliberate step under controlled conditions which results in the oxidation of the surface of the carbon hybrid particles obtained from the milling step. This is demonstrated, for example, in Table 8, wherein it is shown that before functionalization the oxygen content was about 0.21% w/w while after functionalization (intensive mixing of carbon hybrid particles in air without external heating) the oxygen content was about 3.4% w/w.

In some embodiments of this aspect, the milling step is carried out until the $D_{90}$ value of non-agglomerated particles, as determined by the wet dispersion method, is less than 5 µm, or less than 3 µm, or less than 2 µm, or less than 1.8 µm and/or until the $D_{50}$ value of non-agglomerated particles is less than 2 µm, or less than 1 µm, or less than 0.75 µm, or less than 0.4 µm, or less than 0.3 µm and/or until the $D_{10}$ value of non-agglomerated particles is less than 0.6 µm, or less than 0.4 µm, or less than 0.2 µm, or less than 0.15 µm.

In certain embodiments, the product from the milling process (step a)) is held in the gas-tight sealed mill for at least 15 minutes, or at least 30 minutes, or at least 45 minutes before carrying out the functionalization (step b)). This holding step allows completion of the agglomeration of the (sub-) micron primary particles. In some embodiments, this holding step in the gas-tight sealed mill is carried out until the agglomerated carbon hybrid particles (determined using the wet dispersion method described below) exhibits the following particle size distribution values:
a $D_{90}$ value of from 20 to 60 µm, or from 30 to 50 µm, or from 40 to 50 µm, and/or
a $D_{50}$ value of from 7 to 15 µm, or from 7 to 12 µm, and/or
a $D_{10}$ value of from 0.3 to 4 µm, or from 0.4 to 3 µm, or from 0.5 to 2 µm.

Alternatively, the holding step in these embodiments is carried out until the $D_{90}$ value of the agglomerated carbon hybrid particles, as determined by the dry dispersion method described below, ranges from 50 to 300 µm, or from 100 to 300 µm, or from 100 to 200 µm, or from 150 to 200 µm.

It was found that the subsequent functionalization process creates the desired surface "oxide" chemistry and, in addition, appears to saturate the active carbon surface.

In an embodiment of the invention, the controlled oxidation is carried out by stirring the material in a mixer. The mixer could be an intensive batch mixer, which serves to mix the material together in a quick, homogeneous and reproducible way. The mixer could also be a paddle batch mixer or a dual shaft paddle batch mixer, for example, which allows a high degree of fluidization of the solid particles facilitating the contact of every carbon hybrid particle with the reaction gas.

In many embodiments of the invention, controlled oxidation is carried out or at least initiated at a temperature of no greater than 400° C., or no greater than 300° C., or no greater than 200° C., or no greater than 100° C., or no greater than 50° C., or no greater than 30° C. Thus, there will be no burn-off of carbonaceous material as is observed in surface-modification processes at temperatures above 400-500° C. Nevertheless, as briefly mentioned before, due to the exothermic reaction of the oxygen containing gas with the carbon particles, a temperature rise (e.g. to about 150° C.) will often be observed in the mixer even if there is no external heating applied to the mixture.

In some embodiments, the controlled oxidation is out carried until the oxygen content is at least 0.45% w/w, or at least 0.85% w/w, or at least 1% w/w, or at least 2% w/w, or at least 3% w/w. Likewise, the controlled oxidation is in most embodiments carried out until the pH is below 7.0. In some embodiments the pH of the particles will be below 6.7, below 6.5, below 6.0, below 5.5, or even below 5.0.

The controlled oxidation is typically carried out in the presence of air, humidity, oxygen, another oxidizing gas and/or an oxidizing liquid. The oxidizing gas can be NOR, ozone or carbon dioxide and the oxidizing liquid can be hydrogen peroxide or nitric acid. In the case of a liquid functionalization process, the resulting product is filtered off and dried after the functionalization. A typical functionalization is performed in a mixer that is flushed with air for at least 15 minutes, or at least 20 minutes, or at least 30 minutes, or at least 45 minutes, or at least 1 hour.

Examples of suitable types of equipment for the milling step (step (a)) described herein include, but are not restricted to, vibration mills, rocker mills, swing mills, planetary ball mills, drum or tumbling mills, ball mills, attritor or attrition mills (horizontal and vertical), pearl and bead mills, and others. In some embodiments of the invention the sealed mill used is an attrition mill or a ball mill, such as a rotating mill, a tumbling mill or, preferably, a vibration mill. Milling media may vary in shape (e.g. spheres, cylinders, cylpeps, rods, etc.), size and material (e.g. steel, iron, ceramic, $ZrO_2$, $Al_2O_3$, etc.) according to the setup of the individual plant or machine used.

In vibration mills, the impact forces are generated by the collision of the balls when the drum container is vibrated. Vibration mills are known to work efficiently as impact forces can be generated efficiently at filling degrees even above 90%. This is a milder method compared to milling by a rotating ball mill, for example, which generally apply higher impact and shear forces on the material to be milled (depending on the rotation speed and filling degree). Accordingly, in a vibrating mill the desired product is formed faster while the foreign particle contamination remains lower due to a lower abrasion of the balls and inner walls of the milling compartment. The contamination with metal impurities therefore stays low but can of course be totally excluded by using non-metal based balls and linings.

Thus, the milling media used in the mill can, according to an embodiment of the invention, be made of non-metallic materials such as $ZrO_2$, $Al_2O_3$ or ceramic. Optionally, the mill is fitted with an internal non-metal lining, preventing further metal contamination of the particles.

Additionally, in many embodiments of this aspect of the invention, the milling (step a)) is carried out for no longer than 150 hours, or no longer than 96 hours, or no longer than 84 hours, or no longer than 72 hours or no longer than 60 hours. A typical milling process involves the mechanical treatment of natural or synthetic graphite, ideally with high purity in gas-tight sealed ball mills or preferably vibration mills. It has been found that total ash content can be further minimized if high purity graphite is used as starting material. The process does not depend on the graphite particle size but in practice, coarse graphite is often used as a starting material.

In certain embodiments, the filling degree of the ball mill should be below 75%, or below 80% and the rotation speed of the mill has to be high enough so that the balls are transported to the drum cylinder top and fall on the graphite/ball mass in the bottom of the drum to maximize the impact forces versus the shear forces on the treated particles.

The hybrid carbon materials may also be produced by a dry milling process, starting from suitable carbon materials, e.g. as described in Example 1 and 3 below, by means of any type of vibrating or rotating dry mill with a gastight milling chamber filled with milling media.

Overall, the skilled person will be aware that the main milling parameters may have to be readjusted to achieve the high surface area (and product specifications) targeted within industrially "acceptable" time limits, i.e. in order to reduce milling time, graphite batch size, milling media type, size and shape, mill filling factor and weight ratio (graphite-to-milling media) will have to be optimized for every specific type of equipment selected.

Polymer Compounds Filled with Surface-Modified Carbon Hybrid Particles

Polymer compounds filled with the surface-modified carbon particles described herein are another aspect of the present invention, showing excellent electrical and thermal conductivity along with good mechanical properties. Examples of polymers can be, but are not limited to, polypropylene, polyethylene, polystyrene, polyimide, polyimide, polyphenylene sulfide, and elastomers such as synthetic or natural rubber. It has been observed that the surface-modified carbon hybrid particles can in most cases be used directly, i.e. as agglomerates, for preparing the filled polymer compound as it has been observed that typical extrusion processes apply sufficient shear stress so as to disperse the agglomerates into the primary (or at least finer) particles which are then stabilized in the polymer.

Use of Surface-Modified Carbon Hybrid Particles as Additives in Battery Electrodes Because the surface-modified carbon hybrid particles as described herein exhibit excellent electrochemical properties, a battery electrode comprising the surface-modified carbon particles as a conductive additive represents a further aspect of the invention. Due to the sub-micron particle size of the primary particles, the present carbon particles exhibit favorable properties, particularly in electrodes containing sub-micron size electrode materials.

In some embodiments, the battery electrode material may additionally include barium sulfate, which is known to prevent lead sulfate deposition as a thin passivating film on the surface of the electrode material by acting itself as a (chemically inert) site for lead sulfate precipitation. Typically, barium sulfate is used at an average particle size of about 1 µm though it may also function with particle sizes slightly larger than 1 µm.

In such embodiments, the barium sulfate is added in an amount of about 0.2 to about 2%, preferably 0.5 to 1.5% or 0.7 to 1.3%, and most preferably at about 1% by weight of the total mass of the electrode (see, for example, Boden, J. Power Sources 73 (1998), pp. 89-92).

In addition, or alternatively, such battery electrodes may contain, besides the surface-modified carbon hybrid particles and possibly barium sulfate, also lignosulfonates as a further additive. Lignosulfonates are complex aromatic polyethers and are known to prevent flocculation of the lead particles due to their amphiphilic nature where the large hydrophobic organic moiety is adsorbed onto the surface of the lead particles while the hydrophilic inorganic component is in touch with the aqueous electrolyte phase, thereby preventing the particles from coalescing or even sintering (see, for example, again Boden, J. Power Sources 73 (1998), pp. 89-92).

In such embodiments, the lignosulfonates are typically added in an amount of about 0.1 to about 1.5%, preferably 0.3 to 1.0% and most preferably at about 0.75% by weight of the total mass of the electrode.

Carbon, barium sulfate and lignosulfates are commonly used as additives and collectively referred to as "expanders". Thus, a further embodiment of the invention relates to mixtures of the surface-modified carbon hybrid particles with lignosulfonates and/or barium sulfate. Such mixtures can for example be used as an additive for the negative electrode of lead acid batteries.

The use of the battery electrodes containing the surface-modified carbon hybrid particles, and, optionally the barium sulfate and/or lignosulfates, in lead acid batteries is yet another aspect of the invention. The surface-modified carbon hybrid particles described herein are suitable for plating lead, which is believed to be due to the high mesopore content and surface "oxide" group chemistry of the surface-modified carbon hybrid particles. Moreover, compared with other carbons having a similar surface area a better resistivity against oxidative corrosion and electrolyte decomposition in lead acid batteries has also been observed for the carbon hybrid particles described herein. In addition, the increased concentration of superficial oxide surface groups causes a more polar carbon surface and therefore increases of the carbons' hydrophilicity. This improved wetting of the carbon hybrid surface in aqueous media leads to advantages in the manufacturing process of the negative electrode mass as the carbon hybrid, compared to typical graphite or carbon black, mixes more readily into the aqueous paste of lead oxide and other negative electrode components.

In a further embodiment of this aspect, the battery electrodes containing the surface-modified carbon hybrid particles can be used as positive electrodes of lithium sulfur batteries. Due to the micro-structure of the surface-modified carbon hybrid particles, they may act as a host for the sulfur acting as the electrochemically active component in the positive electrode. It has been found that positive electrodes containing sulfur absorbed within the microstructure of the surface-modified carbon hybrid particles show excellent mechanical stability and resistivity against oxidative corrosion.

In yet another embodiment of the invention, the battery electrode described herein can be used as an electrochemical double layer capacitor. In some embodiments the electrochemical double layer capacitors have an average capacitance of above 7 F/g, or above 6 F/g, or above 5.5 F/g.

Use of Surface-Modified Carbon Hybrid Particles as Catalyst Supports

The use of the surface-modified carbon particles defined herein as carbon supports represents another aspect of the invention. When used as carbon support, or skeleton, e.g. in air electrodes used in fuel cells and metal air electrodes, the metal or metal oxide catalysts can be finely dispersed on the amorphous carbon surface. It is thought that the surface "oxides" and pores function as anchor points to stabilize the catalyst finely dispersed on the carbon surface, which appears to suppress any segregation effects during preparation and operation. The high and homogeneous dispersion of the metal catalyst cannot be achieved in typical graphite powders, which is thought to be at least in part due to the absence of the aforementioned surface morphology exhibited by the carbon hybrid particles as described herein.

Dispersions of Surface-Modified Carbon Hybrid Particles

A dispersion of the surface-modified carbon particles described herein in a liquid in the presence of a surfactant to form colloidal carbon dispersions represents another aspect of the present invention. These dispersions can be obtained by a process involving cleaving the agglomerate particles obtained from the functionalization step by applying energy mainly in the form of shear forces and stabilizing the primary particles by using surfactants (e.g. wetting agents) in liquid polar media.

This dispersion process thus represents a further embodiment of this aspect of the invention. This dispersion process can, for example, be carried out in an attrition mill. It appears that the polar surface morphology of the carbon hybrid particles facilitates the wetting process with water or polar solvents, which aids the preparation of colloidal carbon dispersions. Accordingly, another related aspect relates to the use of the surface-modified carbon particles described herein to form a dispersion in a liquid in the presence of a surfactant by applying shear force to deagglomerate the particles. Examples of surfactants that can be used are, but are not limited to, n-alkyl polyethylene oxide, polyethylene glycol, iso-alkyl polyethylene oxide or polyethylene glycol.

The dispersions described hereinabove can for example be used as a base for conductive coatings.

Measurement Methods

The percentage (%) values specified herein are by weight, unless specified otherwise.

Specific BET Surface Area, DFT Micropore and Mesopore Volume and Area

The method is based on the registration of the absorption isotherm of liquid nitrogen in the range $p/p0=0.04$-$0.26$, at 77 K. The nitrogen gas adsorption is performed on a Quantachrome Autosorb-1. Following the procedure proposed by Brunauer, Emmet and Teller (Adsorption of Gases in Multimolecular Layers, *J. Am. Chem. Soc.,* 1938, 60, 309-319), the monolayer capacity can be determined. On the basis of the cross-sectional area of the nitrogen molecule, the monolayer capacity and the weight of sample, the specific surface can then be calculated. The isotherm measured in the pressure range $p/p0$ 0.01-1, at 77K are measured and processed with DFT calculation in order to assess the pore size distribution, micro- and meso pore volume and area.

Reference: Ravikovitch, P., Vishnyakov, A., Russo, R., Neimark, A., Langmuir 16 (2000) 2311-2320; Jagiello, J., Thommes, M., Carbon 42 (2004) 1227-1232.

Particle Size Distribution (PSD)

The presence of particles within a coherent light beam causes diffraction. The dimensions of the diffraction pattern are correlated with the particle size. A parallel beam from a low-power laser lights up a cell which contains the sample suspended in water. The beam leaving the cell is focused by an optical system. The distribution of the light energy in the focal plane of the system is then analyzed. The electrical signals provided by the optical detectors are transformed into particle size distribution by means of a calculator. The method yields the proportion of the total volume of particles to a discrete number of size classes forming a volumetric particle size distribution (PSD). The particle size distribution is typically defined by the values $D_{10}$, $D_{50}$ and $D_{90}$, wherein 10 percent (by volume) of the particle population has a size below the $D_{10}$ value, 50 percent (by volume) of the particle population has a size below the $D_{50}$ value and 90 percent (by volume) of the particle population has a size below the $D_{90}$ value.

The particle size distribution data by laser diffraction quoted herein have been measured with a MALVERN Mastersizer S. For determining the PSD, a small sample of a carbon material is mixed with a few drops of wetting agent and a small amount of water. The sample prepared in the described manner is introduced in the storage vessel of the apparatus (MALVERN Mastersizer S) and after 5 minutes of ultrasonic treatment at an intensity of 100% and the pump and stirrer speed set at 40%, a measurement is taken.

As an alternative to the wet dispersion method of the particles described above, a dry dispersion measurement by Malvern can also be applied, whereby powder samples are dispersed by a means of an air-jet (MALVERN DRY POWDER FEEDER MSX64). The observed PSD values, in particular $D_{90}$ values, by the dry dispersion method were observed to be noticeably higher for the agglomerates described herein since the shear forces applied during wet dispersion have been found to be sufficient to break the agglomerates into smaller particles compared to the dry dispersion method where shear forces are much smaller.

References: ISO 13320 (2009)/ISO 14887

Primary Particle Size

Carbon aggregates were cleaved via milling in an attrition mill of a water dispersion of the carbon (20% carbon, 5% wetting agent). The primary particle size is measured after different milling times until the carbon aggregates are completely converted to the primary particles. The PSD method above relating to determine the particle size distribution is also used to determine the primary particle size (wet dispersion).

Oxygen Content

Oxygen mass fractions in solid samples are evaluated using the principles of inert gas fusion or solid carrier gas heat extraction. The sample is placed in a graphite crucible and inserted into an electrode furnace. The crucible is maintained between the upper and lower electrodes of an impulse furnace. A high current passes through the crucible after purging with inert gas (He or Ar) creating an increase of the temperature (above 2500° C.). Gases generated in the furnace are released into flowing inert gas stream. The gas stream is then sent to the appropriate infrared (O as CO by NDIR) or thermal conductivity (N and H by TCD) detectors for measurement. Instrument calibrations are performed using known reference materials.

pH Value

A sample of 1.5 g of carbon is dispersed in distilled water with the aid of a few drops of acetone and of an ultrasonic treatment. The electrode of the calibrated pH meter is placed in the slurry. After a stabilization time of 2 minutes the slurry is stirred and the pH value is recorded to the nearest 0.05 unit. (ASTM D1512-95 (method B))

Tapped Density 100 g of dry graphite powder is carefully poured into a graduated cylinder.

Subsequently, the cylinder is fixed on the off-centre shaft-based tapping machine and 1500 strokes are run. The reading of the volume is taken and the tap density is calculated.

Reference: —DIN-ISO 787-11

Scott Density

Dry carbon powder is passed through the Scott volumeter and is subsequently collected in a 16.39 cm$^3$(1 in$^3$) vessel and weighed to a 0.1 mg accuracy. The Scott density is calculated from the ratio of weight and volume.

Reference: —ASTM B 329-98 (2003)

Oil Absorption

The oil absorption test is a means to determine the general behavior of graphite and graphite-type materials in respect of absorption of liquids. A slow filter paper is placed into a centrifuge metal tube having an inner diameter of 13.5 mm and a sieve on the bottom (18 mesh). In order to wet the filter, 0.5 g of paraffinic oil is filled into the tube and centrifuged for 30 minutes at 521 g (1 g=9.81 m/s2, corresponding to 1500 rpm in the Sigma 6-10 centrifuge). After the wetting procedure, the tube is weighed and 0.5 g of graphite powder is added. The graphite is covered with 1.5 g of paraffinic oil and centrifuged for 90 minutes at 521 g. After centrifuging, the tube is weighed. The oil absorption per 100 g of graphite powder is calculated on the basis of the weight increase.

Oil Absorption Number

The oil absorption number test is a means to determine the general behavior of carbon black and carbon black-type materials in respect of absorption of liquids. Paraffin oil is added by means of a constant-rate burette to a dried (1 h at 125° C.) carbon black sample in a mixer chamber of the absorptometer. As the sample absorbs the oil, the mixture changes from a free-flowing state to one of a semi-plastic agglomeration, with an accompanying increase in viscosity. This increased viscosity is transmitted to the torque-sensing system. When the viscosity reaches a predetermined torque level, the absorptometer and burette will shut off simultaneously. The volume of the added oil is read from the burette. The volume of oil per unit mass of the carbon black is the oil absorption number.

Reference:—ASTM D2414-01

Ash Content

A low-walled ceramic crucible is ignited at 800° C. in a muffle furnace and dried in a dessicator. A sample of 10 g of dry powder (accuracy 0.1 mg) is weighed in a low-walled ceramic crucible. The powder is combusted at a temperature of 815° C. (1472° F.) to constant weight (at least 8 h). The residue corresponds to the ash content. It is expressed as a percentage of the initial weight of the sample. (DIN 51903 and DIN 51701 (dividing process))

Metal Concentration (for Iron and Lead in Carbon Samples)

This analysis is performed by an SDAR OES simultaneous emission spectrometer. Carbon powder, ground to a maximum particle size of 80 μm by means of a vibrated mill is compacted to a tablet. The sample is placed onto the excitation stand under argon atmosphere of the spectrometer. Subsequently the fully automatic analysis can be initiated. Reference: (i) K. Slickers *Automatic Emission Spectroscopy* Brühl Druck und Presshaus Giessen (D) (1992), (ii) M. Wissler und P. Gebhardt *Protokoll der 29. Sitzung des Unterausschusses Feststoffe im Arbeitskreis Kohienstoff der Deutschen Keramischen Gesellschaft* (12./13. Dez 1984)

Crystallite Size $L_a$

Crystallite size $L_a$ is calculated from Raman measurements using equation:

$$L_a[\text{Angstrom}(\text{Å})]=C\times(I_G/I_D)$$

where constant C has values 44 [Å] and 58 [Å] for lasers with wavelength of 514.5 nm and 632.8 nm, respectively. $I_G$ and $I_D$ are the intensity of the G- and D-band Raman absorption peaks at 1580 cm$^{-1}$ and 1320 cm$^{-1}$, respectively.

Crystallite Size $L_c$

Crystallite size $L_c$ is determined by analysis of the (002) and (004) diffraction profiles. For the present invention, the method suggested by Iwashita (N. Iwashita, C. Rae Park, H. Fujimoto, M. Shiraishi and M. Inagaki, Carbon 42, 701-714 (2004)) is used. The algorithm proposed by Iwashita has been specifically developed for carbon materials. The widths of the line profiles at the half maximum of sample and reference are measured. By means of a correction function, the width of pure diffraction profile can be determined. The crystallite size is subsequently calculated by applying Scherrer's equation (P. Scherrer, Göttinger-Nachrichten 2 (1918) p. 98).

Interlayer Spacing c/2

The interlayer space c/2 is determined by X-ray diffractometry. The angular position of the peak maximum of the (002) diffraction profiles are determined and, by applying the Bragg equation, the interlayer spacing is calculated. The carbon sample is mixed with a silicon standard. A mixture of polyglycol and ethanol is added in order to obtain a highly viscous slurry. Subsequently, a thin layer of approx. 150 μm is applied to a glass plate and dried. A Cu Kα X-ray beam is used.

Reference: Klug and Alexander, *X-Ray diffraction Procedures* John Wiley and Sons Inc., New York London (1967)

Degree of Graphitization

Degree of Graphitization (P) with the meaning of the relative frequency (in percentage) of finding nearest neighboring layers ordered into a graphitic orientation is calculated as:

$$P = \frac{d - a'}{a'' - a'}$$

where d is the measured average interlayer spacing measured according to the method above. a' is the interlayer distance for a random orientation (0.344 nm), and a" is the spacing for a graphitic orientation (0.3354 nm).
Reference: H. Takahashi Carbon 2 (1965) 432

Powder Conductivity, Compressibility, and Compression Work

A powder sample is pressed in a die and simultaneously a current passes through the sample via the anvil and the piston of the die. The body of the die is insulating. Pressure, force, sample thickness, and voltage are measured while compressing the sample. Specific resistivity is calculated as following:

$$\rho(P) = \frac{A \cdot V(P)}{i \cdot t(P)}$$

where $\rho(P)$ is the specific resistivity as a function of the pressure, A is the cross section area of the samples, i is the applied current, V(P) is the established voltage difference, and t(P) is the thickness of the sample. For comparison purposes $\rho(P)$ is reported as a function of sample density calculated as following:

$$\varrho(P) = \frac{m}{A \cdot t(P)}$$

where Q(P) is the density of the sample and m is its mass. The mechanical work for compression is calculated as $$E_i = \sum_{j=1}^{i} p_j S(h_{j-1} - h_j)$$

where E is the mechanical work of compression, p is the pressure, S is the cross section area and h is the thickness (N. Probst, E. Grivei, Carbon 40 (2002) 201-205).

Lead Impregnation

A 10 wt % dispersion of carbon in 1M aqueous $Pb(NO_3)_2$ is stirred for 24 h. It is then filtered and the remaining carbon is repeatedly washed with deionized water and then dried. BET surface area and Pb content is measured on the dry carbon according to the methods described above.

Immersion Potential

Electrochemical potential of a bound carbon based electrode dipped in a 1M aqueous $Pb(NO_3)_2$ solution measured against a $Hg/Hg(SO_4)/3.8M\ H_2SO_4$ reference electrode (Potential vs NHE 634 mV). The given value is an average over the first minute of immersion.

Lead Deposition

An electrochemical cell using a bound carbon based electrode as working electrode, a $Hg/Hg(SO_4)/3.8M\ H_2SO_4$ reference electrode and a counter electrode is assembled using 1M aqueous $Pb(NO_3)_2$ as electrolyte. A 1s potentiostatic pulse at $-1.5$ V vs. reference electrode is applied after 60 s of equilibration time at the open circuit potential. The working electrode is rested at the open circuit potential for 60 s after the potentiostatic pulse and then carefully washed in deionized water and dried. The dried electrode is observed with a scanning electron microscope to visualize possible lead deposition.

Powder Conductivity of Mixtures

Resistivity of mixtures of carbon and another material is measured according to the method above. Resistivities at the pressure of 4.5 $kNcm^{-2}$ for different mixtures are plotted as a function of the carbon concentration.

Double Layer Capacitance

Cyclic voltammetries are measured on bound carbon electrodes in 1M $H_2SO_4$ electrolyte in a three electrode arrangement with a $Hg/Hg(SO_4)/3.8M\ H_2SO_4$ reference electrode and a counter electrode. The cyclic voltammetries are measured in the potential range 0.1--0.5V vs. reference electrode in order to avoid faradaic reactions at the scan rate 1 mV/s. The specific double layer capacitance is derived from the average absolute current in the in the potential range 0--0.4V as following:

$$C = \frac{|i|}{s \cdot m}$$

where C is the specific capacitance, [i] is the average absolute current in the potential range 0--0.1V, s is the scan rate, and m is the active material mass of the tested electrode.

Hydrogen Evolution

Cyclic voltammetries are measured on bound carbon electrodes in 1M $H_2SO_4$ electrolyte in a three electrode arrangement with a $Hg/Hg(SO_4)/3.8M\ H_2SO_4$ reference electrode and a counter electrode. The cyclic voltammetries are measured in the potential range 0.1--1.2V vs. reference electrode. $H_2$ evolves at a potential of ca. $-0.8$V for the considered systems. The charge involved in $H_2$ evolution is calculated as following:

$$Q = \left| \int_{-0.6V}^{-1.2V} \frac{i}{m} dt \right| - C \cdot 0.6$$

where Q is the specific charge involved in $H_2$ evolution, i is the current, m is the active material mass in the electrode, t is the time, and C is the specific capacitance. The reduction charge is calculated from the cyclic voltammetry in the potential range $-0.6$--$1.2$V. From the so calculated charge value, the charge needed to charge the double layer (C·0.6) is subtracted.

Spring Back

Spring-back is a source of information regarding the resilience of compacted graphite powders. A defined amount of powder is poured into a die. After inserting the punch and sealing the die, air is evacuated from the die. A compression force of about 1.5 $tons/cm^2$ is applied and the powder height is recorded. This height is recorded again after pressure has been released. Spring-back is the height difference in percent relative to the height under pressure.

Having now described the various aspects of the present invention in general terms, it will be apparent to those of skill in the art that many modifications and slight variations are possible without departing from the spirit and scope of the present invention. Some embodiments will now be described by way of illustration, with reference to the following numbered embodiments and working examples.

1. Surface-modified carbon hybrid particles comprising a graphite core coated with amorphous carbon in agglomerate form having a BET surface area of at least 50 m$^2$/g, or at least 80 m$^2$/g, or at least 100 m$^2$/g and no greater than 800 m$^2$/g and a DFT mesopore area of at least 40 m$^2$/g, or at least 60 m$^2$/g, or at least 70 m$^2$/g, or at least 80 m$^2$/g and no greater than 400 m$^2$/g.

2. The surface-modified carbon hybrid particles of embodiment 1, wherein the ratio of DFT mesopore area to total DFT pore area is from 20 to 90%, or from 45 to 75%, or from 50 to 70%.

3. The surface-modified carbon hybrid particles of embodiment 1 or embodiment 2, wherein the DFT mesopore volume is at least 0.10 cm$^3$/g, or at least 0.17 cm$^3$/g, or at least 0.29 cm$^3$/g.

4. The surface-modified carbon hybrid particles of embodiments 1 to 3, wherein the ratio of DFT mesopore volume to total DFT pore volume is from 50 to 95%, or from 70 to 95%.

5. The surface-modified carbon hybrid particles of embodiments 1 to 4, wherein the agglomerates have a $D_{90}$ value (as determined by the wet dispersion method) of from 20 to 60 μm, or from 30 to 50 μm, or from 40 to 50 μm and/or a $D_{50}$ value of from 7 to 15 μm, or from 7 to 12 μm and/or a $D_{10}$ value of from 0.3 to 4 μm, or from 0.4 to 3 μm, or from 0.5 to 2 μm and/or a $D_{90}$ value (as determined by the dry dispersion method), of from 50 to 300 μm, or from 100 to 300 μm, or from 100 to 200 μm, or from 150 to 200 μm.

6. The surface-modified carbon hybrid particles of embodiments 1 to 5, wherein the oxygen content is at least 0.45% w/w, or at least 0.85% w/w, or at least 1% w/w, or at least 2% w/w, or at least 3% w/w.

7. The surface-modified carbon hybrid particles of embodiments 1 to 6, wherein the pH of the particles is below 7.0, or below 6.5, or below 6.0, or below 5.0.

8. The surface-modified carbon hybrid particles of embodiments 1 to 7, wherein the tapped density is from 0.35 to 0.7 g/cm$^3$, or from 0.4 to 0.7 g/cm$^3$, and/or wherein the Scott density is from 0.2 to 0.6 g/cm$^3$, or from 0.25 to 0.6 g/cm$^3$ 9. The surface-modified carbon hybrid particles of embodiments 1 to 8, wherein the oil absorption is 150% w/w or less, or 140% w/w or less, or 120% w/w or less, or 100% w/w or less, or 80% w/w or less.

10. The surface-modified carbon hybrid particle of embodiments 1 to 9, wherein the ash content is below 0.1%, or below 0.08%, or below 0.05%.

11. The surface-modified carbon hybrid particles of embodiments 1 to 10, wherein the Fe content value is below 500 ppm, or below 400 ppm, or below 300 ppm, or below 200 ppm, or below 160 ppm.

12. The surface-modified carbon hybrid particles of embodiments 1 to 11, wherein the crystallite size $L_a$ (as measured by Raman spectroscopy) is from 1 to 10 nm, or from 3 to 8 nm, or from 4 to 6 nm.

13. The surface-modified carbon hybrid particles of embodiment 1 to 12, wherein the crystallite size $L_c$ (as measured by XRD) is from 10 to 100 nm, or from 10 to 60 nm, or from 10 to 50 nm.

14. The surface-modified carbon hybrid particles of embodiments 1 to 13, wherein the degree of graphitization is from 80 to 95%, or from 85 to 95%, or from 90 to 95%.

15. The surface-modified carbon hybrid particles of embodiments 1 to 14, wherein the $D_{90}$ value of non-agglomerated particles (as determined by the wet dispersion method) is less than 10 μm, or less than 8 μm, or less than 5 μm, or less than 4 μm, or less than 3 μm, or less than 2 μm, or less than 1.8 μm and/or wherein the $D_{50}$ value of non-agglomerated particles is less than 4 μm, or less than 2 μm, or less than 1 μm, or less than 0.75 μm, or less than 0.4 μm, or less than 0.3 μm and/or wherein the $D_{10}$ value of non-agglomerated particles is less than 0.6 μm, or less than 0.4 μm, or less than 0.2 μm, or less than 0.15 μm.

16. A method of making surface-modified carbon hybrid particles as defined in any one of embodiments 1 to 15, comprising the steps of; a) milling graphite in a gas-tight sealed mill; b) functionalizing the resulting hybrid carbon by controlled oxidation.

17. The method of embodiment 16, wherein step a) is carried out until the $D_{90}$ value of non-agglomerated particles (as determined by the wet dispersion method) is less than 10 μm, or less than 8 μm, or less than 5 μm, or less than 4 μm, or less than 3 μm, or less than 3 μm, or less than 1.8 μm and/or wherein the $D_{50}$ value of non-agglomerated particles is less than 4 μm, or less than 2 μm, or less than 1 μm, or less than 0.75 μm, or less than 0.4 μm, or less than 0.3 μm and/or wherein the $D_{10}$ value of non-agglomerated particles is less than 0.6 μm, or less than 0.4 μm, or less than 0.2 μm, or less than 0.15 μm.

18. The method of embodiments 16 or 17, wherein the product from step a) is held in the gas-tight sealed mill for at least 15 minutes, or at least 30 minutes, or at least 45 minutes before carrying out step b).

19. The method of embodiment 18, wherein the product from step a) is held in the gas-tight sealed mill until the $D_{90}$ value (as determined by the wet dispersion method) of from 20 to 60 μm, or from 30 to 50 μm, or from 40 to 50 μm and/or a $D_{50}$ value of from 7 to 15 μm, or from 7 to 12 μm and/or a $D_{10}$ value of from 0.3 to 4 μm, or from 0.4 to 3 μm, or from 0.5 to 2 μm and/or a $D_{90}$ value (as determined by the dry dispersion method), of from 50 to 300 μm, or from 100 to 300 μm, or from 100 to 200 μm, or from 150 to 200 μm.

20. The method of embodiments 16 to 19, wherein the controlled oxidation is carried out by stirring the particles obtained in step a) in a mixer.

21. The method of embodiments 16 to 20, wherein the controlled oxidation is carried out at a temperature no greater than 400° C., or no greater than 300° C., or no greater than 200° C., or no greater than 100° C., or no greater than 50° C., or no greater than 30° C.

22. The method of embodiments 16 to 21, wherein the controlled oxidation is out carried until the oxygen content is at least 0.45% w/w, or at least 0.85% w/w, or at least 1% w/w.

23. The method of embodiments 16 to 22, wherein the controlled oxidation is carried out until the pH is below 7.0, or below 6.5, or below 6.0, or below 5.0.

24. The method of embodiments 16 to 23, wherein the controlled oxidation is carried out in the presence of air, humidity, oxygen, another oxidizing gas and/or an oxidizing liquid.

25. The method of embodiment 24, wherein the oxidizing gas is NOR, ozone or carbon dioxide.

26. The method of embodiment 24, wherein the oxidizing liquid is hydrogen peroxide or nitric acid.

27. The method of embodiments 16 to 26, wherein the sealed mill is a ball mill, such as a rotating mill, a tumbling mill or a vibration mill.

28. The method of embodiments 16 to 27, wherein the mill chamber is fitted with an internal lining.

29. The method of embodiments 16 to 28, wherein ceramic balls are used in step a).

30. The method of embodiments 16 to 29, wherein step a) is carried out for no longer than 150 hours, or no longer than 96 hours, or no longer than 84 hours, or no longer than 72 hours or no longer than 60 hours.

31. The method of embodiments 16 to 30, wherein after step b) the product is dispersed in a liquid in the presence of a surfactant or a polymer compound by applying shear force to deagglomerate the particles.
32. The surface-modified carbon hybrid particles as defined in any one of embodiments 1 to 15, obtainable by the method as defined in any one of embodiments 16 to 31.
33. A mixture of the surface-modified carbon hybrid particles according to any one of embodiments 1 to 15 or embodiment 32, and lignosulfonates and/or barium sulfate as an additive for the negative electrode of lead acid batteries.
34. A battery electrode comprising the surface-modified carbon particles of any one of embodiments 1 to 15 or embodiment 32, or the mixture of embodiment 33 as a conductive additive.
35. The battery electrode of embodiment 34, wherein the barium sulfate is added in an amount of about 0.2 to about 2% by weight of the total mass of the electrode.
36. The battery electrode of embodiment 34 or 35, wherein the lignosulfonates are added in an amount of about 0.1 to about 1.5% by weight of the total mass of the electrode.
37. A polymer compound filled with the surface-modified carbon particles of any one of embodiments 1 to 15 or embodiment 32.
38. Use of the battery electrode of any one of embodiments 34 to 36 in lead acid batteries.
39. Use of the battery electrode of embodiment 34 in lithium sulfur batteries.
40. Use of the battery electrode of embodiment 34 in electrochemical double layer capacitors.
41. The use according to embodiment 38, wherein the electrochemical double layer capacitors have an average capacitance of above 7 F/g, or above 6 F/g, or above 5.5 F/g.
42. Use of the surface-modified carbon particles of any one of embodiments 1 to 15 or embodiment 32 as carbon supports.
43. A dispersion of the surface-modified carbon particles of any one of embodiments 1 to 15 or embodiment 32 in a liquid in the presence of a surfactant.
44. Use of the surface-modified carbon particles of any one of embodiments 1 to 15 or embodiment 32 to form a dispersion in a liquid in the presence of a surfactant by applying shear force to deagglomerate the particles.
45. Use of the dispersion of embodiment 40 or 41 as a conductive coating.

EXAMPLES

Example 1—Method for the Preparation of Surface-Modified Carbon Hybrid Particles Raw synthetic graphite with grain size distribution finer than 20-30 mm and preferentially finer than 1 mm was loaded into a vibrating ball mill (type VIBRATOM SM 125 by Siebtechnik-Germany) being filled at about 70-80% volume with steel balls with diameter of about 50 mm for a total weight of 1400 kg. The quantity of graphite loaded corresponds to a graphite-to-milling media ratio of about 16-20. The vibrating tube mill was sealed gastight and the (dry) milling process was carried out in the gastight milling chamber of the vibrating ball mill. After the milling process was finalized, the ground carbon was rested for about 0.5 h in the sealed (airtight) milling chamber and then transferred into an intensive batch mixer (Eirich, Germany 75 L batch size) for the functionalization process. The carbon material was gently stirred in contact with air for a minimum of 1 h without any heating (i.e. starting at room temperature though the mixture warms up due to the exothermic reaction) resulting in surface-modified carbon hybrid particles (herein also referred to as carbon hybrids) characterized by the following parameters.

TABLE 1

| Carbon Hybrid | Milling Time [h] | BET SSA [m$^2$/g] | Mesopore Area [m$^2$/g] | Superficial Oxygen Groups [wt. %] |
|---|---|---|---|---|
| A | 5 | 107 | 74 | 0.87 |
| B | 10 | 224 | 129 | 1.3 |
| C | 16.5 | 290 | 165 | 1.6 |
| D | 32 | 431 | 227 | 3.4 |
| E | 48 | 501 | 249 | 4.1 |

The carbon hybrids obtained according to Example 1 were further characterized and compared with other carbon materials such as synthetic graphite (TIMREX® SFG6—TIMCAL Graphite and Carbon), expanded graphite (TIMREX® BNB90—TIMCAL Graphite and Carbon), carbon black (ENSACO® 350G—TIMCAL Graphite and Carbon), and activated carbon (YP50F—Kuraray Chemical Co.):

TABLE 2

| Carbon Material | Oxygen content [%] | pH | BET surface area [m$^2$/g] |
|---|---|---|---|
| Carbon Hybrid A | 0.87 | 5.1 | 107 |
| Carbon Hybrid C | 1.6 | 4.7 | 290 |
| Carbon Hybrid D | 3.4 | 4.5 | 431 |
| Carbon Black | 0.41 | 10 | 800 |
| Synthetic graphite | 0.16 | 5.4 | 16 |
| Expanded Graphite | 0.32 | 5.9 | 24 |

TABLE 3

| Carbon Material | Oil Absorption (%) | Spring Back (%) |
|---|---|---|
| Carbon Hybrid A | 79 | 14 |
| Carbon Hybrid B | 93 | 18 |
| Carbon Hybrid C | 102 | 18 |
| Carbon Hybrid D | 110 | 19 |
| Carbon Hybrid E | 120 | 17 |
| Carbon black | >600 | 88 |
| Synthetic graphite | 175 | 11 |
| Activated carbon | 155 | 75 |
| Expanded graphite | 166 | 11 |

TABLE 4

| Carbon material | La [nm] | Lc [nm] | c/2 [nm] | Degree of graphitization P [%] | Tapped density [g/cm$^3$] |
|---|---|---|---|---|---|
| Carbon Hybrid A | 5.7 ± 0.5 | 53 | 0.3361 | 92 | 0.676 |
| Carbon Hybrid B | 4.8 ± 0.3 | 41 | 0.3361 | 92 | 0.641 |
| Carbon Hybrid D | 4.9 ± 0.8 | 18 | 0.3370 | 83 | 0.431 |
| Expanded graphite | 24.3 ± 10.5 | 40 | 0.3360 | 93 | 0.079 |
| Synthetic graphite A | 24.9 ± 1.1 | 175 | 0.3357 | 97 | 0.12 |
| Activated Carbon | 0 | 0 | 0 | 0 | 0.305 |
| Synthetic graphite B | — | — | — | 99 | — |

TABLE 5

| Carbon Material | Average capacitance F/g | BET SSA (m$^2$/g) |
|---|---|---|
| Carbon Hybrid A | 7.5 | 110 |
| Carbon Hybrid B | 20.1 | 220 |
| Carbon Hybrid C | 25.1 | 275 |
| Carbon Hybrid D | 58.7 | 419 |
| Carbon Hybrid E | 58.3 | 481 |
| Expanded graphite | 4.4 | 24 |
| Carbon black | 20.6 | 753 |
| Synthetic graphite | 4.9 | 9 |
| Activated carbon | 198 | 1473 |

TABLE 6

Figure 4:
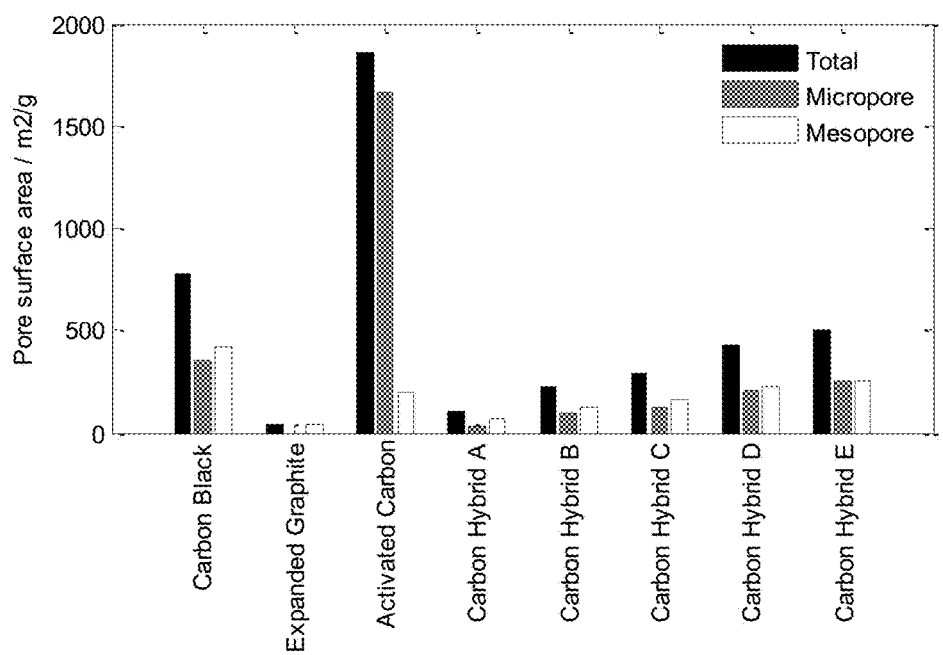
FIG. 4 shows the total surface area, micropore surface area and mesopore surface area of the surface-modified carbon hybrid particles of Example 1 in comparison with carbon black, expanded graphite and activated carbon.

Mesopore and Micropore surface area (cf. FIG. 4)

| | BET area (m$^2$/g) | DFT area (m$^2$/g) | Micropore area (m$^2$/g) | Micropore area (%) | Mesopore area (m$^2$/g) | Mesopore area (%) |
|---|---|---|---|---|---|---|
| Carbon hybrid A | 107 | 105 | 31 | 30 | 74 | 70 |
| Carbon hybrid B | 224 | 223 | 94 | 42 | 129 | 58 |
| Carbon hybrid C | 290 | 288 | 123 | 43 | 165 | 57 |
| Carbon hybrid D | 431 | 431 | 204 | 47 | 227 | 53 |
| Carbon hybrid E | 501 | 505 | 256 | 51 | 249 | 49 |
| Carbon black | 809 | 777 | 357 | 46 | 420 | 54 |
| Expanded graphite | 30 | 44 | 0 | 0 | 44 | 100 |
| Activated carbon | 1382 | 1854 | 1659 | 89 | 195 | 11 |

TABLE 7

Figure 5:
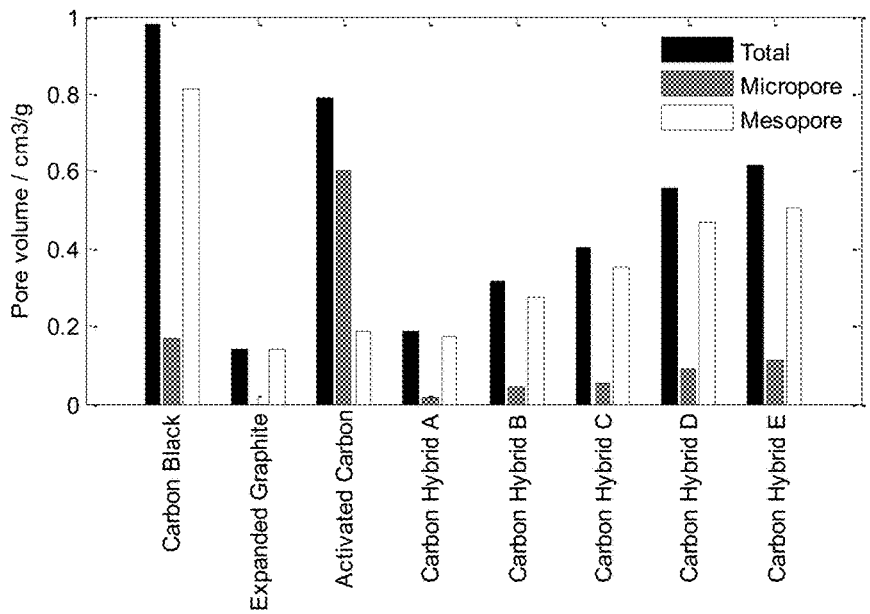
FIG. 5 shows the total pore volume, micropore volume and mesopore volume of the surface-modified carbon hybrid particles of Example 1 in comparison with carbon black, expanded graphite and activated carbon.
Figure 6:
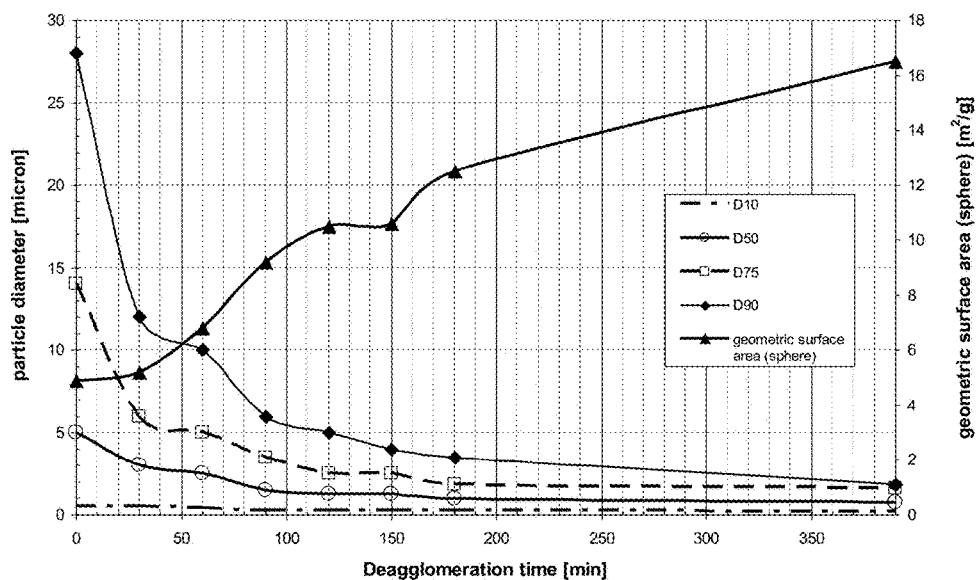
FIG. 6 shows the particle size and geometric surface area change of sample D of the surface-modified carbon hybrid particles of Example 1 during deagglomeration.

Mesopore and Micropore volume (cf. FIG. 5)

| | DFT pore volume (cm$^2$/g) | Micropore volume (cm$^2$/g) | Micropore volume (%) | Mesopore volume (cm$^2$/g) | Mesopore volume (%) |
|---|---|---|---|---|---|
| Carbon hybrid A | 0.187 | 0.014 | 8 | 0.173 | 93 |
| Carbon hybrid B | 0.315 | 0.042 | 13 | 0.273 | 87 |
| Carbon hybrid C | 0.405 | 0.055 | 14 | 0.350 | 86 |
| Carbon hybrid D | 0.557 | 0.090 | 16 | 0.466 | 84 |
| Carbon hybrid E | 0.615 | 0.113 | 18 | 0.503 | 82 |
| Carbon black | 0.979 | 0.166 | 17 | 0.813 | 83 |
| Expanded graphite | 0.142 | 0 | 0 | 0.142 | 100 |
| Activated carbon | 0.791 | 0.603 | 76 | 0.188 | 24 |

The following table shows data obtained for carbon hybrid D before and after the functionalization step (controlled oxidation).

TABLE 8

| Carbon hybrid D | Before functionalization (oxidation) but after storage in air at RT for 24 h | After functionalization (oxidation in air at RT in an intensive mixer for 3 h, temperature measured in sample 140 °C.) |
|---|---|---|
| Oxygen content [wt.%] | 0.21 | 3.4 |
| c/2 [nm] | 0.3367 | 0.337 |
| L$_c$ [nm] | 20 | 18 |

TABLE 8-continued

| Carbon hybrid D | Before functionalization (oxidation) but after storage in air at RT for 24 h | After functionalization (oxidation in air at RT in an intensive mixer for 3 h, temperature measured in sample 140 °C.) |
|---|---|---|
| L$_a$ [nm] | 5.8 | 4.9 |
| Graphitization (P-factor) | 85 | 83 |
| BET [g cm$^{-3}$] | 389 | 419 |
| Micropore area [m$^2$ g$^{-1}$] | 192 | 204 |
| Mesopore area [m$^2$ g$^{-1}$] | 205 | 227 |
| Micropore volume [cm$^3$ g$^{-1}$] | 0.052 | 0.055 |
| Mesopore volume [cm$^3$ g$^{-1}$] | 0.326 | 0.350 |
| Particle size distribution (Laserdiffraction MALVERN Mastersizer S) Dry dispersion of particles in a MALVERN DRY POWDER FEEDER MSX64) | | |
| D$_{10}$ [µm] | 2.3 | 2.1 |
| D$_{50}$ [µm] | 18.7 | 15.8 |
| D$_{90}$ [µm] | 183.8 | 147.9 |
| Wet dispersion (5 min. ultrasonic treatment) | | |
| D$_{10}$ [µm] | 1.1 | 1.1 |
| D$_{50}$ [µm] | 10.9 | 10.9 |
| D$_{90}$ [µm] | 44.8 | 43.1 |

Example 2—Alternative Method for the Preparation of Surface-Modified Carbon Hybrid Particles Raw synthetic graphite with grain size distribution finer than 20-30 mm and preferentially finer than 1 mm was loaded into a vibrating ball mill (type VIBRATOM SM 125 by Siebtechnik-Germany) being filled at about 70-80% volume with steel balls with diameter of about 50 mm for a total weight of 1400 kg. The quantity of graphite loaded corresponds to a graphite-to-milling media ratio of about 15. The vibrating ball mill was sealed gastight and the (dry) milling process was carried out in the gastight milling chamber of the vibrating ball mill. After the graphite was milled for 96 h, the ground carbon was rested for about 0.5 h in the sealed (airtight) milling chamber and then transferred into an intensive batch mixer (Eirich, Germany 75 L batch size) for the functionalization process. The functionalization of the resulting carbon material was done by gently stirring the carbon material in the batch mixer flooded by a gas mixture containing 10% of oxygen in nitrogen and 90% relative humidity for 3 h. The resulting hybrid carbon showed a BET SSA of 720 m$^2$/g and a mesopore area vs. total DFT area ratio of 45%.

Example 3—A Further Alternative Method for the Preparation of Surface-Modified Carbon Hybrid Particles Raw natural graphite with grain size distribution of −50 mesh was loaded into a vibrating tube mill (type VIBRATOM SM 125 by Siebtechnik-Germany) being filled at about 70-80% volume with steel balls with diameter of about 50 mm for a total weight of 1400 kg. The quantity of graphite loaded corresponds to a graphite-to-milling media ratio of about 20. The vibrating ball mill was sealed gastight and the (dry) milling process was carried out in the gastight milling chamber of the vibrating ball mill. After the graphite was milled for 20 h, the ground carbon was rested for about 0.5 h in the sealed milling chamber and then transferred into an intensive batch mixer (Eirich, Germany 75 L batch size) for the functionalization process. The functionalization of the resulting carbon material was done by gently stirring the carbon material in the batch mixer flooded by air for 1 h. The resulting hybrid carbon showed a BET SSA of 330 m$^2$/g and a mesopore area vs. total DFT area ratio of about 56%.

Example 4—A Further Alternative Method for the Preparation of Surface-Modified Carbon Hybrid Particles Same raw synthetic graphite materials as described in Example 1 were loaded into a drum (or tumbling) ball mill with a chamber volume of about 43 liters and a chamber diameter of 400 mm being filled at about 20-30% volume with steel balls with diameter of about 30 mm for a total weight of 50 kg. The quantity of graphite ("batch") loaded corresponds to a graphite-to-milling media ratio of about 20-30. The milling process was carried out in the airtight sealed milling chamber of the rotating mill (rot. speed=50-80 rpm) for a total duration of 5, 16, 32 and 48 h depending on the BET targeted resulting in hybrid carbons with a BET SSA of about 100, 300, 400 and up to 500 m$^2$/g, respectively after the functionalization process which was done in the intensive batch mixer flooded with air for 1 h. Milling time, graphite batch, milling media type, size and shape, together with mill filling and weight ratio are the process parameters that allow to adjust the final properties of the products, i.e. BET surface area, PSD, Scott density.

Example 5—A Further Alternative Method for the Preparation of Surface-Modified Carbon Hybrid Particles The surface-modified carbon hybrid particles were produced according to the procedures described in Example 1 and 3, but prior to start of the milling process, the milling chamber was purged with a flow of inert gas (typically nitrogen or argon). Gas flow and purging time were selected with the purpose of reducing to a minimum the amount of air trapped in the milling chamber. The process efficiency could be improved by more than 10% in terms of reduction of milling time. Other means of improving the purging efficiency, like setting the milling chamber shortly in motion, may be applied as well.

Example 6—A Further Alternative Method for the Preparation of Surface-Modified Carbon Hybrid Particles The carbon hybrid particles were produced according to the procedures described in Example 1 & 3, but the milling chamber was in this instance fitted with an internal lining in order to reduce (metal) contamination of the product. Ceramic, rubber, polymer or other type of material may be used for the aforementioned lining. Milling media made of ceramic, $ZrO_2$, or $Al_2O_3$ were also be utilized for the same purpose. The surface-modified carbon hybrid particles obtained by using the aforementioned mill yielded products having a similar BET surface area, PSD and mesopore content, although slightly longer milling times were required in some instances compared to iron or stainless steel milling media. Grinding with the non-metal grinding media did not lead to any increase of the metal contamination like iron, nickel, molybdenum, and vanadium. In fact, the iron content of the obtained particles was well-below 50 ppm or even less (depending on the purity of the starting material).

Example 7—Preparation of an Aqueous Colloidal Dispersion of Surface-Modified Hybrid Carbon Particles 60 kg of the sample D of the (as obtained from Example 1) was mixed with 384 kg of water containing 37 kg of a $C_{16}$-$C_{18}$ alkyl polyglycolether (—$OC_2H_5$)$_n$, wherein n=25 and 3 kg of 25% aqueous ammonia using a dissolver (power: 44 kW, stirring time 1 h). The aqueous pre-mixture was then further treated in an attrition mill (power: 55 kW) for 6 h until a viscosity of 1300 mPas (at 10 1/s) and a $D_{50}$ of 0.7 µm, and a $D_{90}$ of 2.5 µm was reached.

The invention claimed is:
1. A method of making surface-modified carbon hybrid particles, the method comprising:
    milling graphite in a gas-tight sealed mill; and
    functionalizing the resulting hybrid carbon by controlled oxidation;
    wherein the surface-modified carbon hybrid particles comprise a graphite core coated with amorphous carbon in agglomerate form having a BET surface area of at least 50 m2/g and no greater than 800 m2/g.
2. The method of claim 1, wherein the milling is carried out until the D90 value of non-agglomerated particles as determined by the wet dispersion method is less than 10 µm;

wherein the D50 value of non-agglomerated particles is less than 4 µm; and/or wherein the D10 value of non-agglomerated particles is less than 0.6 µm.

3. The method of claim 1, wherein the product from the milling is held in the gas-tight sealed mill for at least 15 minutes before carrying out the functionalizing; or wherein the product from the milling is held in the gas-tight sealed mill until the particles have a D90 value as determined by the wet dispersion method ranging from 20 to 60 µm, a D50 value ranging from 7 to 15 µm, a D10 value ranging from 0.3 to 4 µm, and/or a D90 value as determined by the dry dispersion method ranging from 50 to 300 µm.

4. The method of claim 1, wherein the controlled oxidation is carried out in the presence of at least one of air, humidity, oxygen, another oxidizing gas, and an oxidizing liquid, wherein the oxidizing gas is NOx, ozone, or carbon dioxide, and wherein the oxidizing liquid is hydrogen peroxide or nitric acid.

5. The method of claim 4, wherein the controlled oxidation is carried out until the oxygen content is at least 0.45% (w/w); and/or wherein the controlled oxidation is carried out until the pH of the particles is below 7.0.

6. The method of claim 1, wherein the product obtained from the functionalizing is dispersed in a liquid in the presence of a surfactant or a polymer compound by applying shear force to deagglomerate the particles.

7. The method of claim 1, wherein the surface-modified carbon hybrid particles have a DFT mesopore area of at least 40 m2/g and no greater than 400 m2/g.

8. A method of making surface-modified carbon hybrid particles, the method comprising:

milling graphite in a gas-tight sealed mill; and functionalizing the resulting hybrid carbon by controlled oxidation;

wherein the surface-modified carbon hybrid particles comprise a graphite core coated with amorphous carbon in agglomerate form having a DFT mesopore area of at least 40 m2/g and no greater than 400 m2/g.

9. The method of claim 8, wherein the surface-modified carbon hybrid particles have a BET surface area of at least 50 m2/g and no greater than 800 m2/g.

10. The method of claim 8, wherein the milling is carried out until the D90 value of non-agglomerated particles as determined by the wet dispersion method is less than 10 µm;

wherein the D50 value of non-agglomerated particles is less than 4 µm; and/or wherein the D10 value of non-agglomerated particles is less than 0.6 µm.

11. The method of claim 8, wherein the product from the milling is held in the gas-tight sealed mill until the particles have a D90 value as determined by the wet dispersion method ranging from 20 to 60 µm, a D50 value ranging from 7 to 15 µm, a D10 value ranging from 0.3 to 4 µm, and/or a D90 value as determined by the dry dispersion method ranging from 50 to 300 µm.

12. The method of claim 8, wherein the controlled oxidation is carried out in the presence of at least one of air, humidity, oxygen, another oxidizing gas, and an oxidizing liquid, wherein the oxidizing gas is NOx, ozone, or carbon dioxide, and wherein the oxidizing liquid is hydrogen peroxide or nitric acid.

13. The method of claim 12, wherein the controlled oxidation is carried out until the oxygen content is at least 0.45% (w/w); and/or wherein the controlled oxidation is carried out until the pH of the particles is below 7.0.

14. The method of claim 8, wherein the product obtained from the functionalizing is dispersed in a liquid in the presence of a surfactant or a polymer compound by applying shear force to deagglomerate the particles.

15. A method of making surface-modified carbon hybrid particles, the method comprising:

milling graphite in a gas-tight sealed mill; and functionalizing the resulting hybrid carbon by controlled oxidation;

wherein the product from the milling is held in the gas-tight sealed mill for at least 15 minutes before carrying out the functionalizing; or wherein the product from the milling is held in the gas-tight sealed mill until the particles have a D90 value as determined by the wet dispersion method ranging from 20 to 60 µm, a D50 value ranging from 7 to 15 µm, a D10 value ranging from 0.3 to 4 µm, and/or a D90 value as determined by the dry dispersion method ranging from 50 to 300 µm.

16. The method of claim 15, wherein the surface-modified carbon hybrid particles comprise a graphite core coated with amorphous carbon in agglomerate form having a BET surface area of at least 50 m2/g and no greater than 800 m2/g, and a DFT mesopore area of at least 40 m2/g and no greater than 400 m2/g.

17. The method of claim 15, wherein the oxygen content of the surface-modified carbon hybrid particles is at least 0.45% w/w; and/or wherein the pH is below 7.0.

18. The method of claim 15, wherein the surface-modified carbon hybrid particles have a tapped density ranging from 0.35 to 0.7 g/cm3; and/or a Scott density ranging from 0.2 to 0.6 g/cm3.

19. The method of claim 15, wherein the surface-modified carbon hybrid particles have an oil absorption of 150% w/w or less; and/or a degree of graphitization ranging from 80 to 95%.

20. The method of claim 15, wherein the controlled oxidation is carried out in the presence of at least one of air, humidity, oxygen, another oxidizing gas, and an oxidizing liquid, wherein the oxidizing gas is NOx, ozone, or carbon dioxide, and wherein the oxidizing liquid is hydrogen peroxide or nitric acid.

* * * * *